United States Patent [19]  
Hoff et al.

[11] 3,932,709  
[45] Jan. 13, 1976

[54] ELECTRONIC BUSINESS TELEPHONE
[75] Inventors: Don G. Hoff, Tiburon; Patrick Young, Oakland, both of Calif.
[73] Assignee: General Teletronics Incorporated, San Francisco, Calif.
[22] Filed: Mar. 7, 1974
[21] Appl. No.: 449,155

Related U.S. Application Data

[63] Continuation-in-part of Ser. No. 351,745, April 16, 1973, abandoned.

[52] U.S. Cl. ............ 179/90 K; 179/2 DD; 179/90 B
[51] Int. Cl.² ..................................... H04M 11/00
[58] Field of Search ..... 179/2 DP, 2 CA, 2 A, 90 B, 179/90 R, 90 K, 84 VF; 235/156, 166, 172

[56] References Cited
UNITED STATES PATENTS

| | | | |
|---|---|---|---|
| 3,518,629 | 6/1970 | Frankel | 340/172.5 |
| 3,553,445 | 1/1971 | Hernandez | 235/156 |
| 3,617,638 | 11/1971 | Jochimsen | 179/90 B |
| 3,632,998 | 1/1972 | Bagley | 235/92 PL |
| 3,647,973 | 3/1972 | James | 179/2 DP |
| 3,652,795 | 3/1972 | Wolf | 179/2 DP |
| 3,670,111 | 6/1972 | Bukosky | 179/90 B |
| 3,692,962 | 9/1972 | Raczynski | 179/90 B |
| 3,760,121 | 9/1973 | Nissim | 179/90 K |

*Primary Examiner*—Kathleen H. Claffy
*Assistant Examiner*—George G. Stellar
*Attorney, Agent, or Firm*—Flehr, Hohbach, Test, Albritton & Herbert

[57] ABSTRACT

An electronic business telephone for the transmission and receipt of voice messages and digital data. The electronic telephone uses MOS/LSI circuitry to store and visually display telephone numbers or other numeric data and includes the capability of performing local arithmetic computation. In telephone mode, after keyboard entry the number to be dialed is stored and visually displayed for pre-dial verification in articulated format with the area code, prefix and suffix suitably spaced for ease of reading. If the number is busy, the displayed telephone number can be entered into a telephone memory and the memorized number subsequently recalled on demand for automatic redial. In data terminal mode, digital numeric information is displayed in non-articulated or compressed format for visual verification prior to transmission and is exchanged between any two electronic telephone systems, or through proper interfacing, from an electronic telephone to a remote computer. In computation mode, the keyboard and display are used in conjunction with an arithmetic processor and an accumulating memory which may be used to perform calculations during telephone conversation if desired. The various operating modes are supervised and coordinated by a control center module in the form of a MOS/LSI BCD microprocessor which performs telephonic and data alignment functions. The Electronics Business Telephone is also shown as the central supervising unit within a total communications terminal system.

17 Claims, 10 Drawing Figures

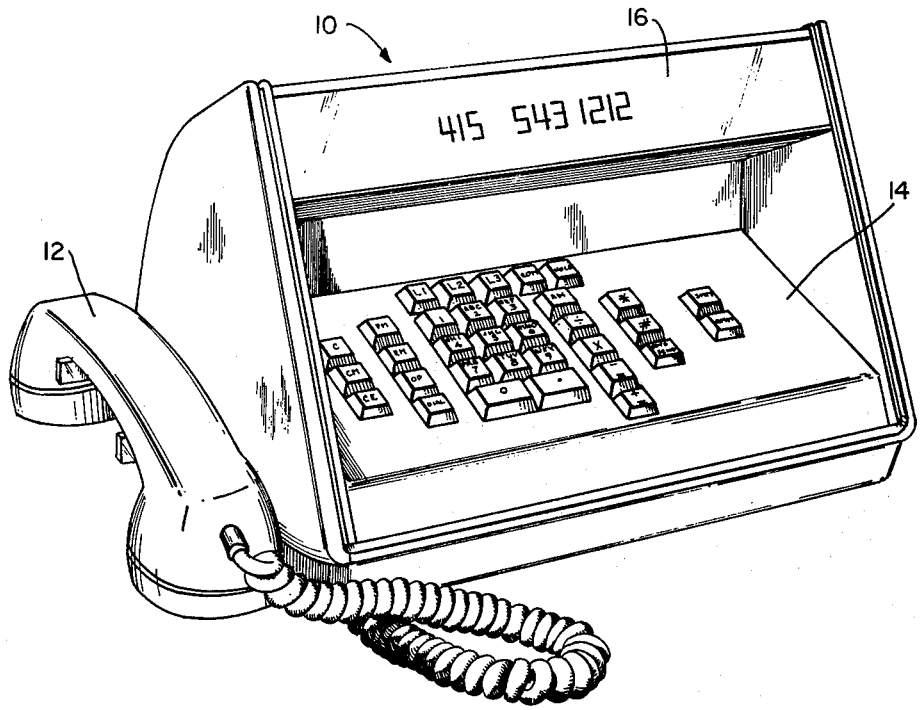
FIG_1
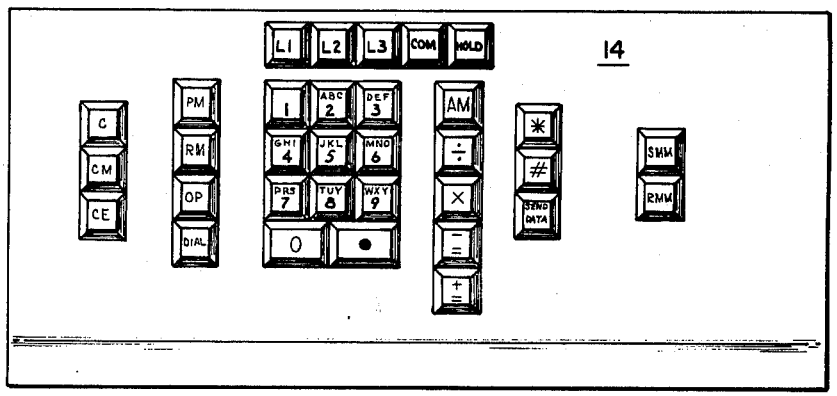
FIG_1A

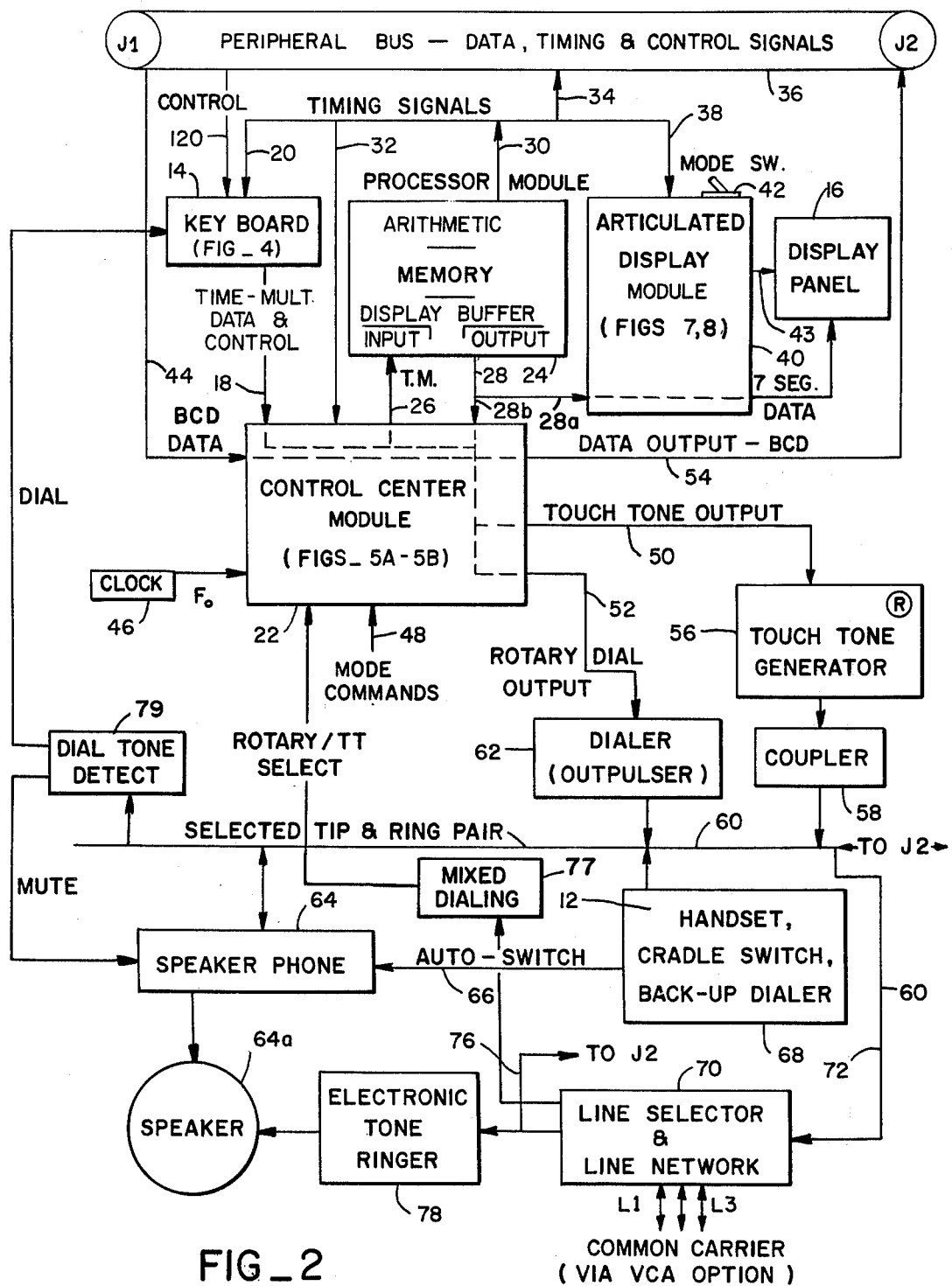
FIG_2

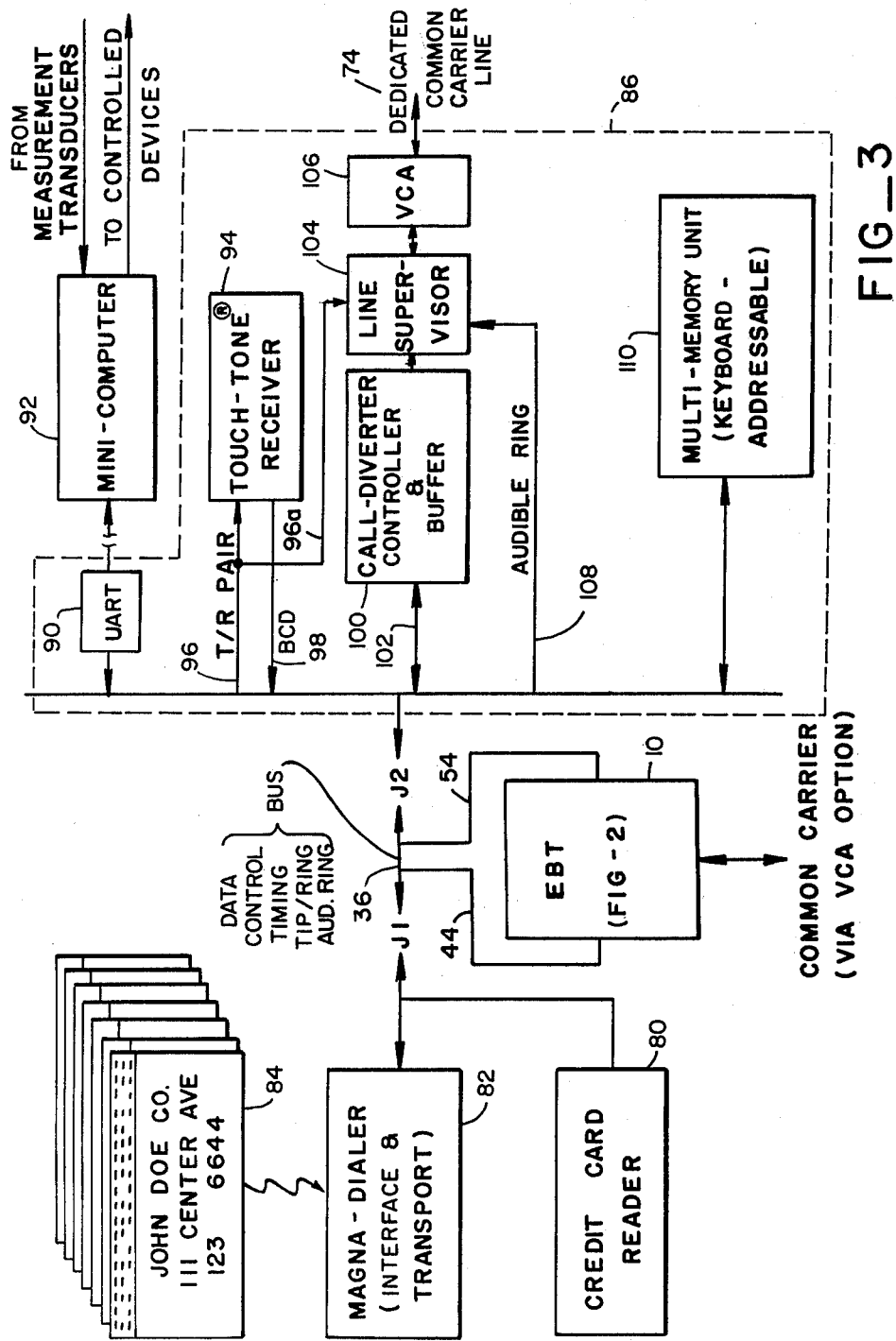

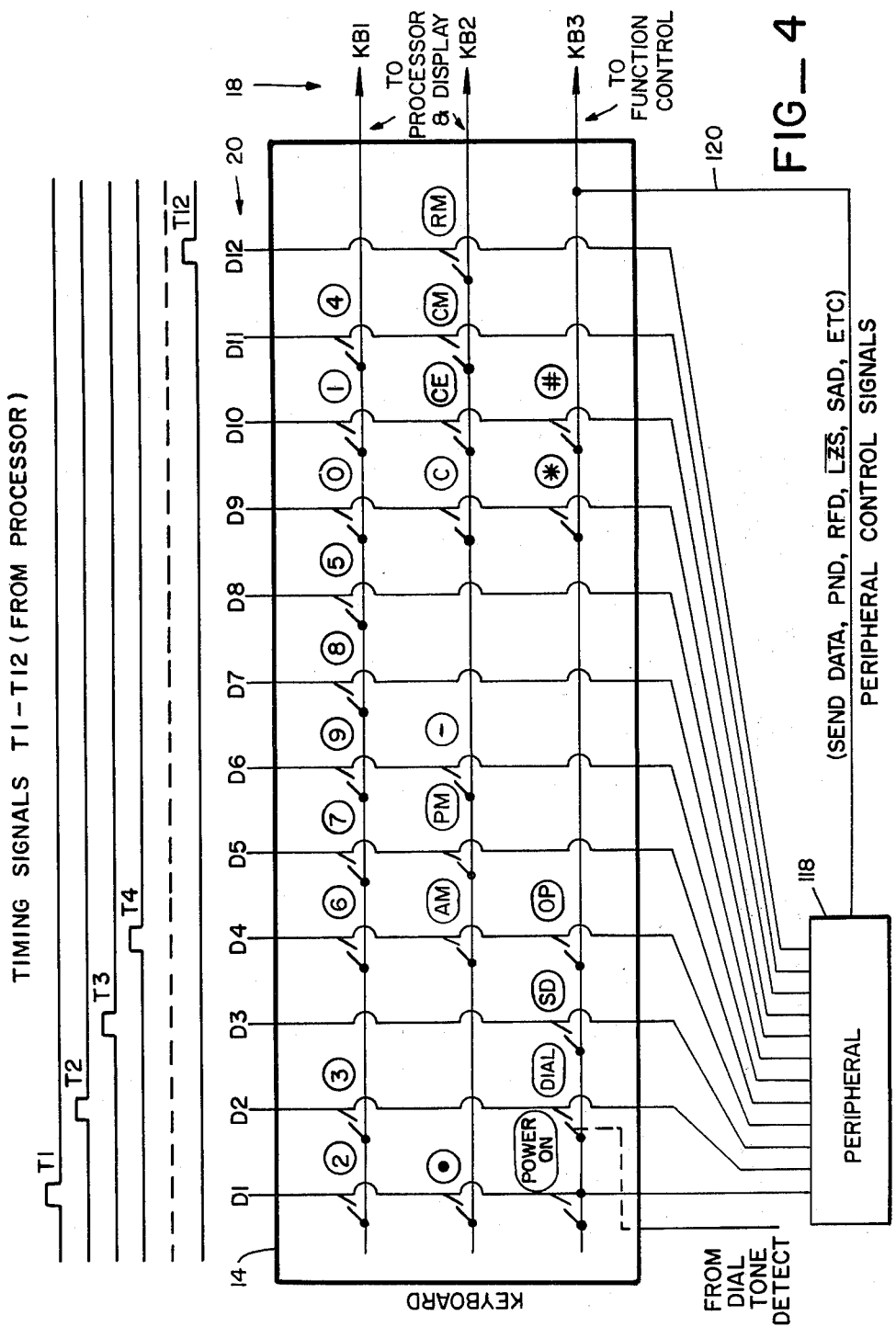
FIG_4

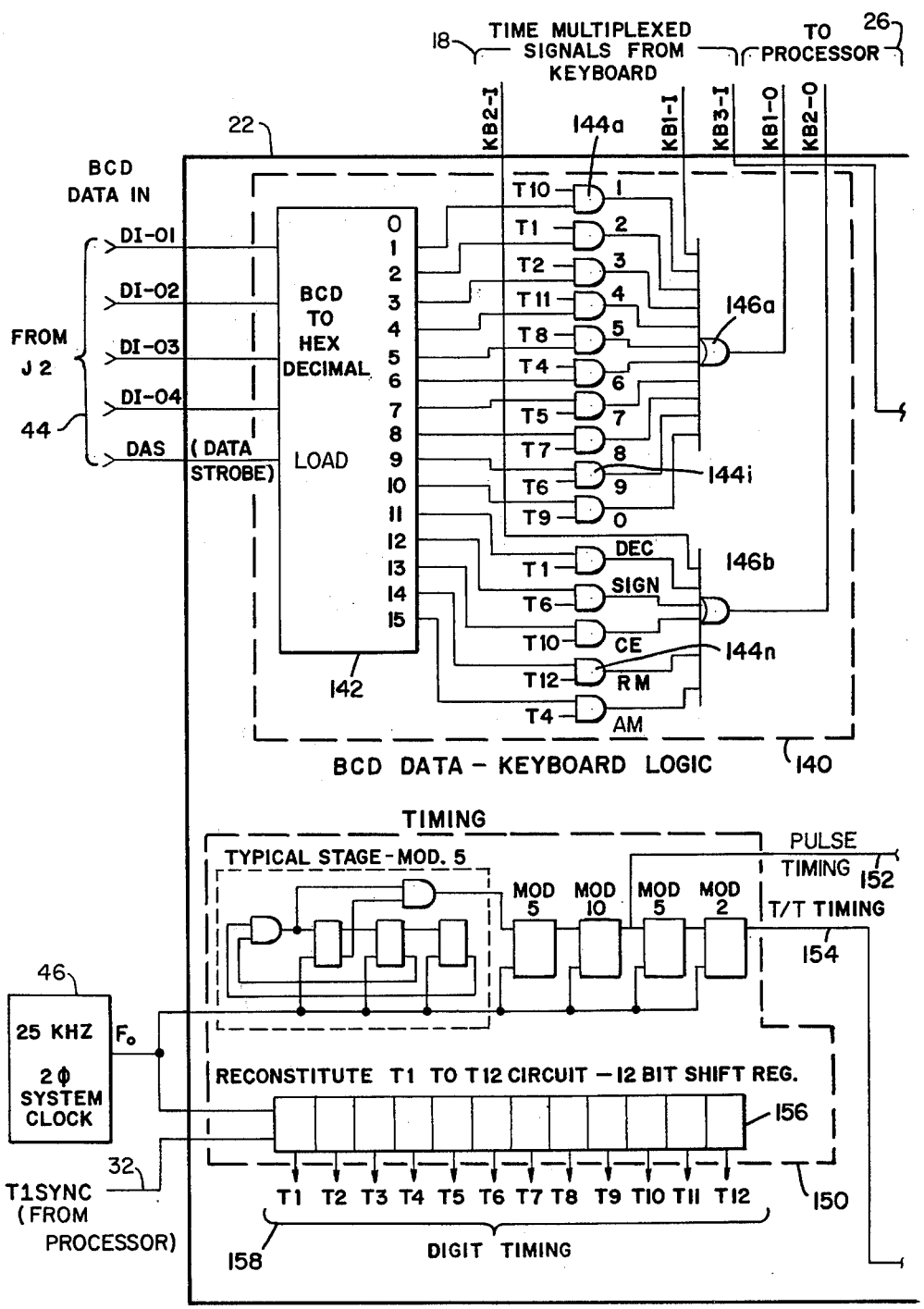
FIG_ 5A

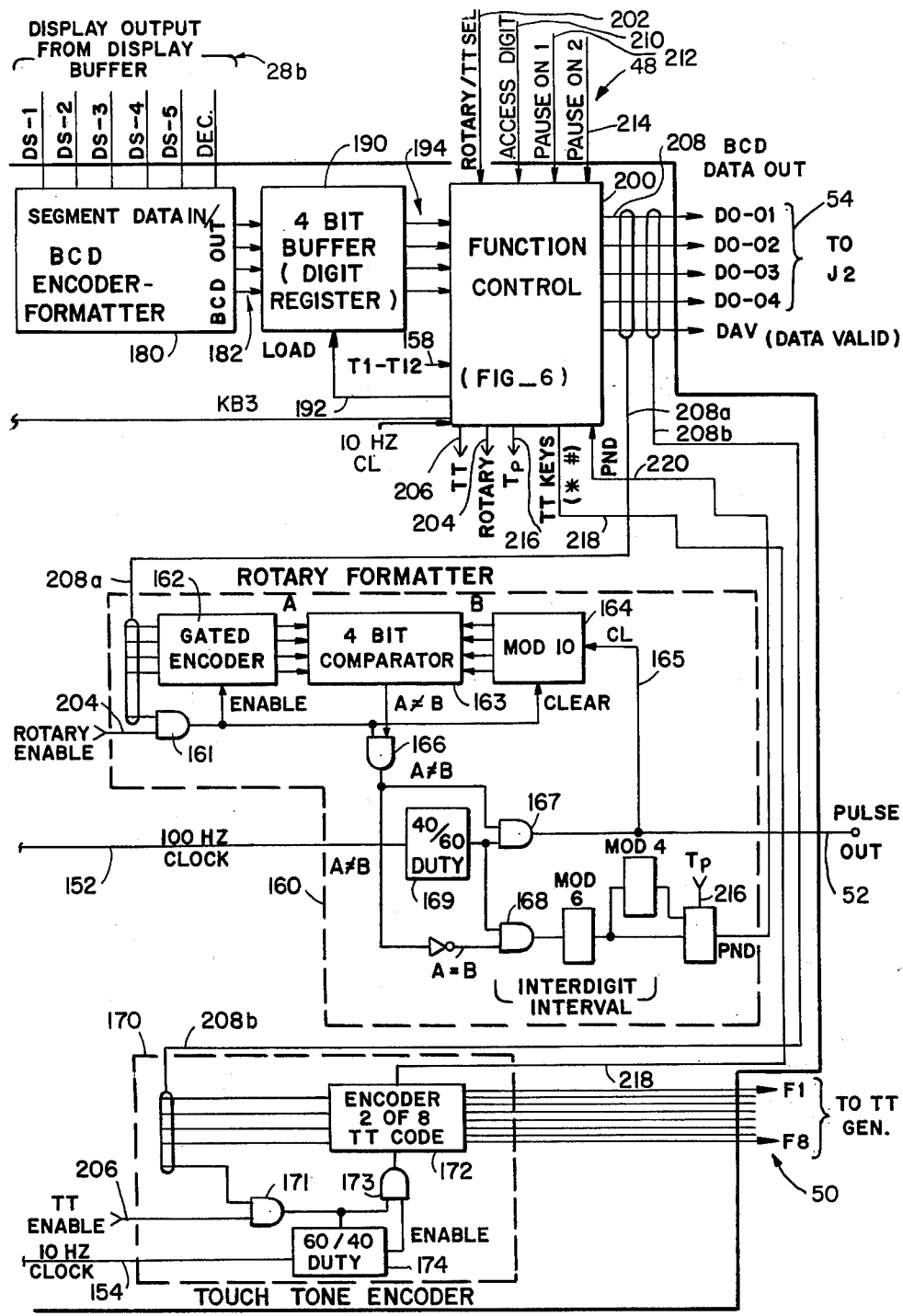
FIG_ 5B

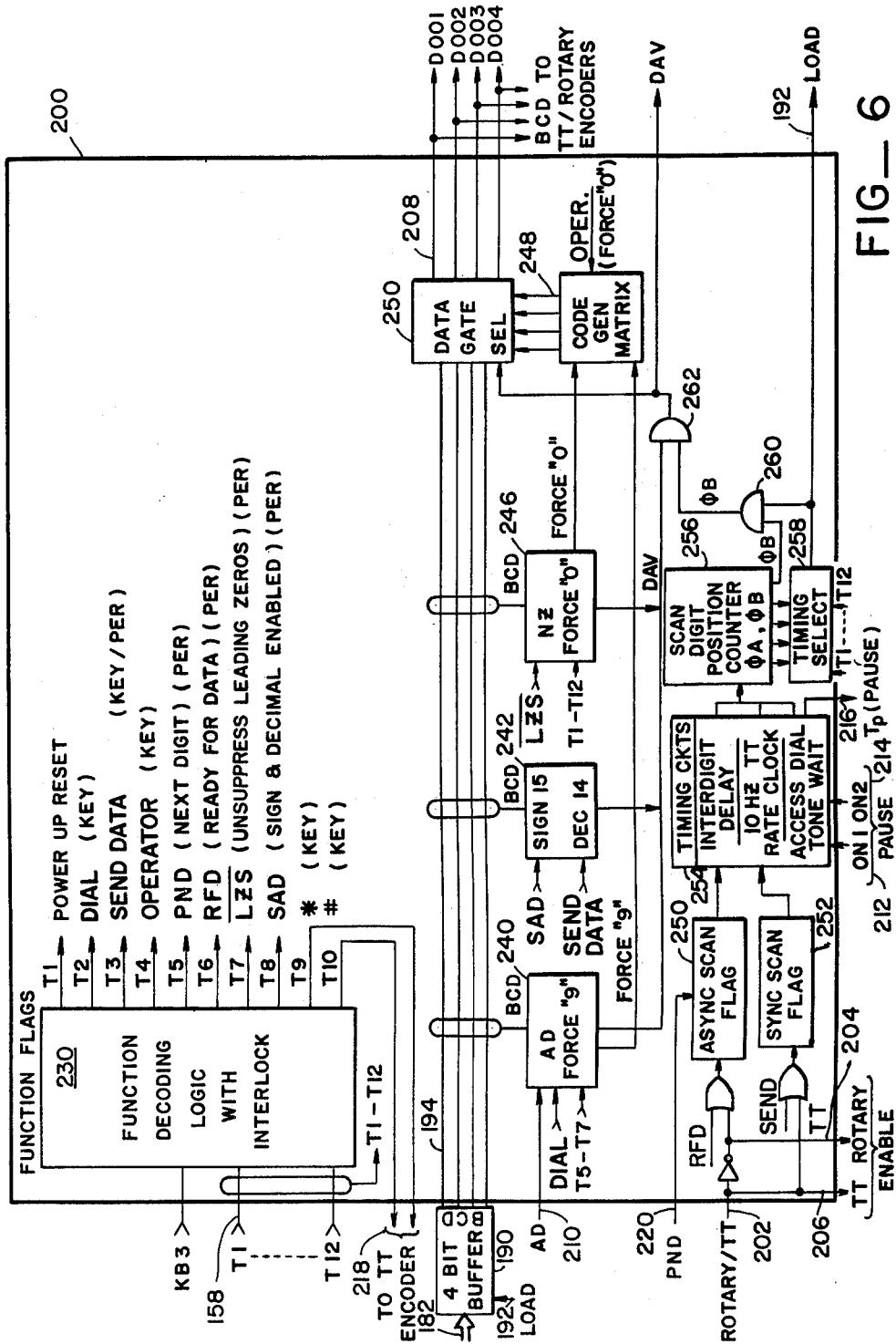
FIG_6

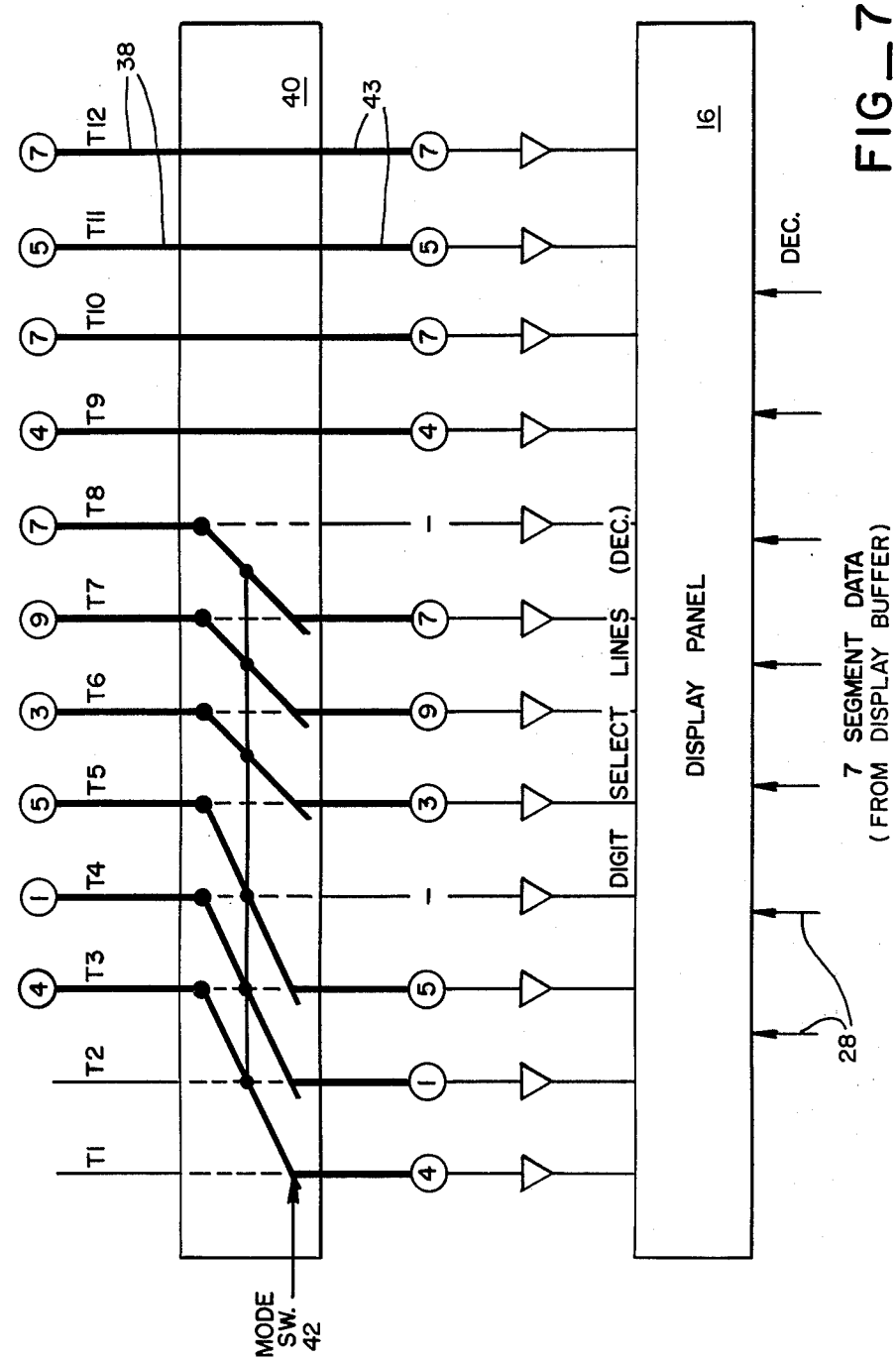

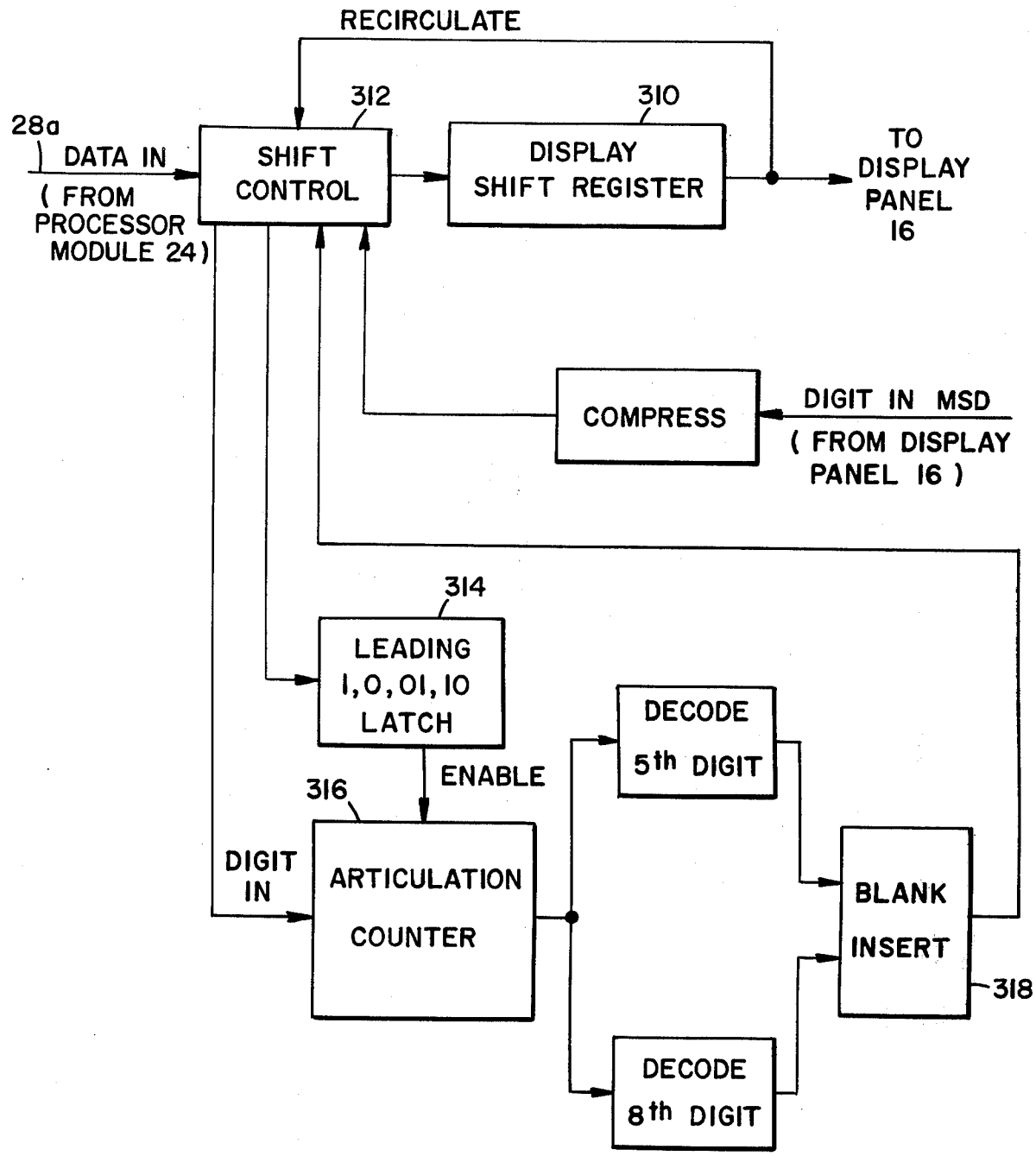
FIG_8

ELECTRONIC BUSINESS TELEPHONE

CROSS REFERENCE TO RELATED APPLICATION

This application is a continuation-in-part of our earlier filed copending U.S. patent application Ser. No. 351,745 entitled "Electronic Business Telephone" filed Apr. 16, 1973, now abandoned.

BACKGROUND OF THE INVENTION

The present invention is a solid state electronic communications terminal which effectively combines telephone, data terminal and arithmetic computation capabilities. The terminal device herein referred to as the Electronic Business Telephone (EBT) transmits and receives both voice and data and includes the local capabilities of storing and displaying telephone numbers or other numeric information and performing arithmetic manipulation of entered data.

The two technologies of telephony and data telecommunications have developed more or less independently up to the present time. The interface between the two areas has been broadened to some extent lately in response to the need for communication of digital data between remote locations over conventional telephone common carrier lines. However, these two technologies have been "adapted" to each other's requirements rather than being truly integrated in the form of a totally new terminal device based on an optimized design approach which serves both functions effectively.

For example, various types of modems or acoustic couplers, such as the Western Electric Type 103A Data Set, marketed under the trademark "Data-Phone" by Bell System, have been developed under pressure from users of computer services in order to provide them with remote access to a central data processing installation through existing communications networks. Another typical device of this nature is shown in U.S. Pat. No. 3,583,554, issued to Le Blang, which discloses a portable numeric display device with is acoustically or electromagnetically coupled to a selective tone generating telephone in order to adapt it to be used as a data terminal. Devices of this type are characterized by the common limitation that they act as an external adjunct to a conventional electromechanical telephone which activates or de-activates the standard electromechanical processes of the telephone.

Similarly in the area of electronic desk calculators, it has been suggested to adapt a conventional calculator to include the capability for entry and dialing of telephone numbers. Such an approach is discussed in generalized terms in British Pat. No. 1,179,585, issued to VEB Elektronische Rechenmaschinen which suggests that a "transmission channel" including a code conversion device be interposed between the keyboard entry register of the calculator and the telephone exchange device.

On the other hand, the telephone industry being considerably older and more firmly committed to existing methods and equipment, due in large part to economic considerations and historical inertia, has not effectively applied newly developed technology in computer systems design and microelectronics to its own customer terminal equipment. The three primary developmental stages of telephone equipment have involved the call placement function and are represented in terms of hardware by the crank telephone, the rotary dial telephone and the selective tone generating (e.g. Touch-Tone) telephone. The present invention represents the next evolutionary phase, the electronic telephone.

SUMMARY OF THE INVENTION

The present invention represents the first application of the combined technology of computer design and MOS/LSI microelectronics to the area of the basic business telephone unit. The inventive application and implementation of technical know-how developed outside the telephone art characterized by the BCD telephone of the present invention makes possible the optimized design of a totally integrated business communications system. More specifically, the electronic business telephone of the present invention (hereinafter referred to as the EBT) integrates into a single desk-top device a range of functions which achieves a utility level never before possible using common carrier lines.

The basic EBT design provides automatic push-button dialing in both rotary telephone and touch-tone telephone areas. After keyboard entry the number to be dialed is visually displayed in articulated format with spacing between area code, prefix and suffix for pre-dial verification and the number is automatically dialed on actuation of a single key. The displayed telephone number can be entered into a telephone memory register and the memorized number can be recalled on demand for automatic redial. In a Centrex-type PBX/PABX environment the appropriate access digit — e.g. "9" — is automatically impressed onto the telephone number prior to initiation of automatic dialing.

The electronic telephone digital display and the pushbutton keyboard can be utilized to perform arithmetic computations either during telephone conversation or separately when the instrument is not being used for voice communication. Computation results are displayed and partial results can be stored for accumulation. Finally, the EBT instrument functions as a data terminal whereby digital information can be visually verified and exchanged between any two electronic telephone systems, or through proper interfacing from electronic telephone to computer.

The total business communication system contemplated by the present invention combines the basic EBT unit with various peripheral devices which further increase the power and utility of the system. For example, a "Magna-Dialer" unit provides the facility of automatic dialing of telephone numbers magnetically prerecorded on conventional business cards which visually identify the party being called. An automatic call diverter unit allows incoming calls to be diverted to any phone or extension number stored in memory and allows a user to update the stored number from a remote location. Finally, a "multi-memory" repertory dialer provides automatic retrieval of frequently called numbers and entry into the electronic telephone for automatic dialing.

DESCRIPTION OF THE DRAWINGS

FIG. 1 is a pictorial representation of a preferred embodiment of the present invention in the form of an electronic business telephone desk-set;

FIG. 1A is an expanded presentation of the keyboard of the desk-set of FIG. 1;

FIG. 2 is an information flow block diagram illustrating the functional subcomponents of the desk-set of FIG. 1 and their logical interrelationship;

FIG. 3 is a block diagram showing the electronic business telephone of FIG. 1 as part of a communications terminal system involving various associated peripheral devices;

FIG. 4 is a schematic representation of the electrical construction of the keyboard shown in FIGS. 1 and 1A;

FIGS. 5A and 5B together comprise a block diagram illustrating the internal functional and logical arrangement of the control center module shown in FIG. 2;

FIG. 6 is a block diagram of the internal functional and logical arrangement of the function control block shown in FIG. 5B;

FIG. 7 is a schematic representation of the internal logic of the articulated display module shown in FIG. 2 based on a "fixed" articulation approach; and, FIG. 8 is a block diagram illustrating logical implementation of a "floating" articulation scheme.

DETAILED DESCRIPTION OF THE INVENTION

FIG. 1 pictorially illustrates the electronic business telephone of the present invention in the form of a desk set terminal shown generally at 10. This unit will be referred to throughout the following description as the "EBT".

The operator interface with the EBT is provided by handset 12, which includes a conventional microphone pick up and speaker, keyboard 14 and digital display panel 16. The handset is used in the conventional manner as an electroacoustical transducer to convert audible sounds into electronic impulses and vice versa for two-way voice message communication. A suitable handset is commercially available for example from ITT under the model designation 510. Display panel 16 is also of conventional design and preferably is of the seven segment Nixie tube type such as the Burroughs Panaplex model. Keyboard 14 is likewise of conventional construction as exemplified by that available from Control Research Corp. Despite its conventionality the internal construction and operation of keyboard 14 will be described in more detail below in connection with FIG. 4 for purposes of clarity of presentation of the overall operation of the EBT system.

The external appearance of keyboard 14 is shown in expanded detail in FIG. 1A which displays the various numeric data and function control keys. These keys will be briefly described at this point and their function will become more clear as the description of the organization and operation of the EBT system proceeds.

The digit keys "0" through "9" and the decimal key are grouped together and represent the means by which numerical data is entered into the EBT system. This data may represent for example the telephone number of a subscriber whom the EBT operator wishes to call, or numerical data to be used either for local arithmetic computation or for transfer to data processing equipment peripheral to the EBT desk unit.

The keys "PM", "RM", "OP" and "DIAL" are grouped together to the left of the digit keys and are used to control telephonic functions such as storage and retrieval of a telephone number to be dialed, operator summons, and automatic call placement. For example, the PM key (phone-memory) stores a telephone number displayed on display panel 16 in the EBT internal memory, while RM (recall memory) retrieves a number previously stored in memory and displays it on display panel 16 for automatic call placement on actuation of the DIAL key. The OP key calls the operator and the DIAL key causes the EBT to generate either a rotary pulse train or Touch-tone encoded signal representing the number visually displayed on panel 16 for transmission through the external common carrier network.

The "C" (clear), "CM" (clear memory) and "CE" (clear entry) keys which are grouped together at the extreme left of the keyboard as shown in FIG. 1A are used to clear either the number displayed on panel 16 (CE), the number stored in the EBT internal memory (CM), or numerical information in both locations (C).

The grouping of five keys immediately to the right of the digit key grouping are the function control keys used while the EBT is operating in arithmetic computation mode. These include the "AM" (accumulate memory) key which combines the number displayed on display panel 16 with the contents of the EBT internal memory whereby the memory functions as an arithmetic accumulator. This is especially useful in accumulating partial results of complex computations. The arithmetic operator keys "÷", "×", "=", "±" are used to control arithmetic functions in a manner similar to that in a conventional electronic desk calculator.

The three keys grouped to the right of the arithmetic function control keys are the data transmission function control keys "*", "#", and "SEND DATA". These keys are used when the EBT is operating in data terminal mode and their use will be understood to be essentially similar to that usually encountered with a Touch-tone type remote computer terminal device.

The two keys at the far right of the keyboard in FIG. 1A "SMM" (store multi-memory), and "RMM" (recall multimemory) are used when the multi-memory repertory dialer peripheral option is incorporated in the EBT system. The multimemory peripheral will be discussed below in connection with FIG. 3.

The final grouping of keys shown in FIG. 1A are the conventional line selection, intercom and hold keys commonly found on multi-line business telephones.

It will thus be seen that keyboard 14 includes various key groupings, each of which is conventionally associated with a single purpose device such as a telephone, electronic desk calculator or data terminal.

The overall organization of a preferred embodiment of the EBT system is shown in FIGS. 2 and 3. FIG. 2 illustrates the logical arrangement of functional subcomponents internal to the basic EBT desk unit 10 as shown in FIG. 1, while FIG. 3 depicts the inter-relationship between the EBT desk unit and its various associated peripherals which together comprise a total electronic communications terminal system.

The manually operated keyboard 14 generates output signals on lines 18 representing numeric information and function control commands. The internal construction and operation of keyboard 14 is more fully discussed below in connection with FIG. 4. As will be described the keyboard output signals are in time-multiplexed form and are generated by the interaction of a sequence of timing signals T1 through T12, supplied to the keyboard over line 20, with closure of internal switch contacts in response to operator key selection.

The time-multiplexed keyboard output signals are supplied over lines 18 to control center module 22. Those keyboard output signals representing telephonic and data terminal function control commands are processed within the control center module as will be more fully described below in connection with FIGS. 5A-B and FIG. 6. Those keyboard output signals representing numeric information and function control commands for computation, storage and display are gated through the control center module directly to processor module 24 over lines 26 for processing within that area. Processor module 24 may be of conventional design such as is typically found in electronic desk calculators.

It should be noted here that while FIG. 2 depicts various functional sub-components of the EBT device as discrete physical entities, this need not necessarily be the case. For example, the control center module and processor module may be physically contained on discrete MOS/LSI integrated circuit chips, or alternatively, several functions may be combined on a single chip. In the former case, as is shown in FIG. 2, a commercially available processor chip may be directly used in an EBT system with a minimum of interfacing, while in the latter case a custom design combination chip would be used with conventional subfunctions patterned after existing commercial circuits. Processor module 24 is of the type commercially available from Caltex under the designation CT5005.

The processor module has three processing sections designated in FIG. 2 as Arithmetic, Memory and Display Buffer. The display buffer section is a holding register which contains information currently being displayed on display panel 16. All numeric data entered from keyboard 14 are thus loaded directly into the display buffer section of the processor module and visually displayed on the display panel.

The memory section of the processor module provides the function of temporary storage of keyboard entered information for recall upon operator command when desired. The memory recall operation transfers the contents of the memory section into the display buffer and display panel overwriting their previous contents. This operation may be used for example in telephone mode in connection with the automatic redial function. In this instance assuming the operator has entered a telephone number into the display buffer and attempted call placement but has found the line busy he can press the PM (phone memory) button on the keyboard and store the busy number in memory. At a later time the operator merely presses the RM (recall memory) button on the keyboard and the previously entered number is transferred to the display buffer and visually presented on the display panel for pre-dial verification. The operator may either visually re-verify the number and then press DIAL to automatically place the call, or, if the re-verification is not needed, he may merely press RM and DIAL in rapid succession thereby immediately initiating automatic call placement.

In computation mode the memory is used in conjunction with the AM (accumulate memory) key as follows. Partial arithmetic results may be cumulatively entered into memory section upon actuation of the AM key each time it is desired to add the immediate computation results held in the display buffer to the running total being developed in the memory section. Use of either PM or AM keys to store information in memory will not disturb the contents of the display buffer which is changed only upon entry of new information from the keyboard through line 26, or by a recall memory command.

The arithmetic (ALU) section of the processor module provides the various arithmetic manipulation logic circuitry and storage registers conventionally associated with an electronic desk calculator.

In addition to the three basic processing sections described above the processor module also has input and output areas used in conversion of data from one coding system to another. For example, in the processor module input section the time-multiplexed keyboard output signals supplied via the control center module over line 26 are encoded into binary coded decimal (BCD) format for handling within the processor module. Similarly in the processor module output section the BCD numeric data is converted to seven segment form prior to transfer to the display panel over processor output line 28. This seven segment display data is also supplied to the control center module where it is immediately reconverted to BCD form for further processing therein as will be described below.

The processor module provides the source of system timing signals T1 through T12 which are used throughout the EBT in various aspects of data decoding and function control. For example, the timing signals which are output from the processor on line 30 are supplied to the keyboard via line 20 and used therein to encode keyboard information into time-multiplexed format. A timing synchronization signal is also supplied to the control center module over line 32 where it is used to reconstitute T1 through T12, decode certain time-multiplexed function control commands supplied directly from the keyboard and sequence various processing operations. The timing signals are also supplied via line 34 to peripheral bus 36 for transfer to the various EBT peripheral devices discussed in connection with FIG. 3. Finally, timing signals are supplied over line 38 to articulated display module 40 to control the display articulation function as follows:

The signals supplied from the display buffer section of the processor module to display panel 16 over line 28a may be displayed in either articulated or non-articulated format. Articulated format refers to that display arrangement most useful in telephone mode wherein the area code, prefix and suffix of the entered subscriber's number are appropriately separated for ease of reading. In numeric mode such as when the EBT is being used either for local computation or remote terminal data input the articulation function is not used and the entered numeric data is compressed to the right in the conventional manner. Articulation of the displayed numbers is controlled by mode switch 42. The internal design and operation of the articulated display module and its interconnection to the display panel is described below in connection with FIGS. 7 and 8. FIG. 7 represents a "fixed articulation" scheme, while FIG. 8 depicts logical implementation of a "floating articulation" approach to display of entered telephone numbers.

The control center module processes input data entering either from the keyboard in time-multiplexed format over lines 18 or from EBT peripheral devices in BCD format over peripheral bus 36 and input lines 44. Keyboard data entered either directly or from the processor module is converted from time-multiplexed to BCD format while in the case of data transferred from the associated EBT peripheral devices the information is already encoded in BCD form. It will be appreciated that although only one line is shown in FIG. 1, in reality it consists of several information lines which together represent the data in coded form. As with the processor module, all data handled within the control center module is in BCD form. Thus display data in seven segment form which is also supplied over line 28b to the control center module is immediately reconverted to BCD for processing therein. After initial processing for display in the processor module input data is returned to the control center module for further processing to produce the desired automatic dialing signals and data transmission signals, or, in the case of local computation, remains in the processor module for arithmetic manipulation and display of results. The control center module also receives inputs in the form of a basic frequency $F_o$ from clock 46 and various optional external operating mode commands 48 which are selectable during assembly of the EBT.

For example, in telephone mode the number contained in the display buffer section of the processor module is processed within the control center module to generate either a Touch-tone or a rotary dial output over lines 50 and 52 respectively depending on the external common carrier environment. In the data transmission mode numeric information processed within the control center module is supplied in BCD form over line 54 to the peripheral bus for transfer and processing by various EBT peripheral devices, for transmission to a remote data processing installation, etc.

When the EBT is operating in telephone mode in a Touch-tone environment the Touch-tone output representing the number to be dialed is supplied from the control center module over line 50 to Touch-tone generator 56 and thereafter through coupler 58 to a selected tip and ring pair 60. Similarly, in a rotary dial environment the pulse EBT representing the number to be dialed which is generated within the control center module is supplied over line 52 to dialer 62 which is in turn connected to the selected tip and ring pair. The Touch-tone generator, coupler0295 and dialer are all of conventional design and commercially available. For example, a suitable Touch-tone generator is available from NRMEC as Model No. 19042. The coupler may be, for example, a Microtran line transformer and the dialer (outpulser) may be of the reed relay type manufactured by Electronic Specialties, Inc.

Various conventional telephone accessories are shown in FIG. 2 connected below the selected tip and ring pair 60. For example, handset 12 (FIG. 1) may be directly connected to the tip and ring line or autoswitch 66 may be used to substitute optional speaker phone attachment 64 for "hands-off" operation. In addition the EBT desk unit 10 may be provided with a conventional backup dialer 68 for use in case of electronic system malfunction. In this situation the entire EBT desk unit would act essentially as a conventional telephone.

Tip and ring pair 60 is shown in FIG. 2 connected to a plurality of common carrier lines L1–L3 through a line selector 70. A voice connecting arrangement (VCA) option connects the line selector to the common carrier lines. Finally, an electronic tone ringer 78 may be interposed between the line selector and speaker 64a to provide an audible electronically generated ring as an alternative to an electromechanical bell ringing system. The common carrier lines L1–L3 are also connected through the tip and ring pair of various HBT peripheral devices.

Due to the incompatability of the two dialing mediums, pulse versus tones, most telephone systems do not permit mixing of keypad tone apparatus with rotary pulse dialing apparatus in a single installation. Because of this, it is common practice to convert all telephones to tone dialing whenever a minority of users wish to enjoy the advantages thereof. Since tone dialing is tariffed at a higher rate than pulse (to cover the cost of additional plant equipment required for tone recognition) the conversion to tone dialing, for the few, is usually inordinately costly.

The electronic business telephone of the present invention, on the other hand, permits tone or pulse dialing from a common keypad. Provision for automatic control of the dialing medium allows complete freedom of intermixing telephone types, thus eliminating the necessity of total conversion with its attendant cost. The value of mixed dialing is realized whenever: (a) a majority of phones are on rotary dial; (b) internal lines ("com-lines") are used; and (c) a minority of phones are to be provided with tone dialing capability for outside lines. Under these circumstances the tone dialing phones will be able to dial on com-line by automatically switching over to rotary dialing whenever a com-line is selected.

This flexibility of dialing medium is achieved by mixed dialing module 77 (FIG. 2) which is connected between line selector 70 and control center module 22. In a multi-button keyset the com-lines are conventionally separated from the outside lines by relocating the "A-1" lead of the line selector. By detecting the current flow at the relocated A-1 lead terminal— i.e., the common tie point of all com-line A-1 leads—a signal can be derived to control the dialing mode of the EBT.

For example, if a com-line is selected, the relocated A-1 lead terminal current flow can be monitored as, for example, by an optical coupler. Thus, the detected presence of current at this point will cause the mixed dialing module to generate a rotary/touch tone select signal which is supplied to the control center module over one of lines 48 (FIG. 2). (This signal is more specifically identified below in connection with FIG. 5B as being input to the CCM function control logic over line 202.)

Stored number dialers when installed behind a PABX system typically depend on a fixed delay redial means following detection of each level of access code. Since this fixed delay must be long enough to ensure the return of a dial tone before redialing, the user is inconvenienced by a compromised delay, perhaps three seconds, every time and dialer is used. Misdialing is possible whenever the exchange is busy for a period longer than the anticipated delay.

To eliminate this problem the electronic business telephone of the present invention utilizes a dial tone detector 79 which quarantees the presence of a dial tone before initiating a continue dial command. The stored number dialer, therefore, can dial through the access code or codes at a rate limited only by the traffic load at the exchange during dialing.

Dial tone detector 79 is also used to mute the speaker phone during the start of a call as follows. Because of the disparity between dial tone level and normal speech level, when using a conventional telephone speakerphone the user must reduce the volume while initiating a call in order to avoid an unpleasantly loud dial tone level. After the call is established the volume must then be restored to an adequate conversation level. It should be noted that this disparity is a problem only in connection with hands off operation, since in handset operations the volume is limited by the CO. The speaker phone, however, is normally operated at a higher level than is the typical handset.

Dial tone detector 79 may be implemented by means of serial connection of a band pass filter having a medium "Q", an amplitude threshold comparator, and a minimum duration detector. The serial connection insures that an input signal must meet all of the requirements imposed by the various circuit elements before a final output indicating presence of a dial tone is generated. While not all of the three circuit elements are essential for dial tone detection, the chances of misdetection are reduced with each additional condition imposed by the corresponding element. The coincident output requirements of all three circuits greatly reduces the design complexity of each element if used alone, or in conjunction with only one other element.

Dial tone detector 79 is designed to recognize dial tones under adverse conditions such as in the presence of voice or other telephone company supervisory signals (party busy, trunk busy, audible ring, recorded messages, etc.) with a low probability of error.

As shown in FIG. 2 the band pass filter section of the dial tone detector 79 is coupled to the selected tip and ring pair 60. The output of the filter is amplitude measured by the comparator, which in turn generates an output if the amplitude exceeds a predetermined threshold. Finally, if the duration of the comparator output exceeds the minimum interval of a preset timer a final output representing a high probability of dial tone detection is generated. This dial tone detector output signal is supplied to keyboard 14 (see FIGS. 2 and 4) where it initiates a dial command and to speakerphone 64 where it mutes the audible dial tone to conversation level.

FIG. 3 shows the EBT as part of an overall arrangement of optional devices which together comprise a complete electronic comminication terminal system. The EBT desk unit 10 is connected to the various associated peripheral devices through bus 36 which contains lines carrying the various numeric data, function control, timing and telephone signals. To the left of the EBT in FIG. 3 are shown two physically discrete peripheral devices; a conventional credit card reader 80 and a "Magnadialer" unit 82. The magnadialer unit is a magnetic stripe reader wherein telephone number and other identifying information relating to a given individual or business enterprise is magnetically encoded on a strip which is attached directly to that party's ordinary business card 84. The card corresponding to the party to be dialed is visually selected by the operator from a conventional calling card file and inserted into the magnadialer reader which interprets the magnetically encoded information and transmits it in BCD form to the EBT desk unit where it is used to generate the appropriate automatic dialing signals.

To the right of the EBT desk unit in FIG. 3 is a group of devices physically combined and shown within the dotted block 86. This peripheral assembly 86 may, for example, take the form of a wall mounted unit in proximity to the EBT desk terminal. Within this unit are devices providing the capabilities of remote mini-computer interfacing, automatic call diversion and repertory dialing.

For example, UART (universal asynchronous receive and transmit) device 90 connects EBT unit 10 via peripheral bus 36 to mini-computer 92. The mini-computer may be stationed either on-site or at a remote location and may for example be used in a process control application for remote management of some physical system. When the EBT is used in data terminal mode, time-multiplexed keyboard data is converted to BCD form in the control center module and handled therein to produce BCD data output on lines 54 (FIG. 2). This information is supplied through peripheral bus 36 and UART 90 to mini-computer 92 for computation or is used to generate control signals. Computation results or physical measurements are returned to the EBT for display through UART 90, peripheral bus 36 and input lines 44. As will be seen more fully in connection with FIG. 5A these BCD input signals are converted to time-multiplexed form within the control center module 22 and supplied to processor module 24 over lines 26 for display on display panel 16. During data terminal operation mode switch 42 will be in its non-articulation position and the numeric data from mini-computer 92 will be displayed in compressed form. The connection between UART 90 and mini-computer 92 may be either via a dedicated line or through the telephone network on a dial-up basis. In the latter case a suitable modem would be interposed between the UART and the common carrier line.

Peripheral assembly 86 also contains Touch-tone receiver 94. This device is useful for example when the EBT system is receiving information in Touch-tone form as from another EBT or a Touch-tone data set. The incoming Touch-tone data signals enter the EBT system through line selector 70 (FIG. 2) and are supplied to Touch-tone receiver 94 through tip and ring pair 60, bus 36 and tip and ring pair 96. The Touch-tone receiver converts the incoming information into BCD form and outputs it on lines 98 to control center module 22 via peripheral bus 36 and data input lines 44 for processing and display.

Automatic call diversion is provided by call diverter 100 which is connected to the EBT desk unit via peripheral bus 36 and line 102. The call diverter unit is also connected to a dedicated common carrier line 74 through line supervisor 104 and voice connecting arrangement (VCA) 106. Line supervisor 104 in turn receives the information portion of an incoming call over line 96a and the audible ring signal over line 108. After an enabling signal is received from the EBT over line 102 automatic call diversion proceeds as follows. An incoming call on a preselected line (e.g. L1) (FIG. 2) is routed by line selector 70 to dedicated line 72 via peripheral bus 36, tip and ring pair 96 and call diverter line supervisor 104. At the same time the corresponding audible ring signal is supplied from line selector 70 to call diverter line supervisor 104 through ring line 76, peripheral bus 36 and ring line 108. Call diverter 100 automatically routes the incoming call to the number previously stored in its internal memory through the dedicated common carrier line 74. The number stored in the call diverter internal memory can be remotely updated via line 102 as desired.

The remaining device within peripheral assembly 86 is multi-memory unit 110.

Briefly, this multi-memory unit is a keyboard addressable repertory dialing memory which contains a plurality of frequently called telephone numbers. A desired number may be automatically selected by the EBT operator upon actuation of the RMM key on keyboard 14 together with a two or three digit identification code. The number selected will be displayed on display panel 16 for pre-dial verification if desired and the call is automatically placed by actuation of the Dial key. Multi-memory unit 110 may also be updated from the keyboard to include new telephone numbers as follows. The new number is entered into the display buffer section of the processor module and displayed on the display panel. The operator then selects an identification code which is also placed in the display buffer and the SMM key is pressed, automatically loading the new number into the multi-memory unit storage area under location control of the corresponding identification code.

It is to be understood that the overall system depicted in FIG. 3 is presented by way of general illustration of the manner in which the EBT may function as the central supervising device within an electronic communications terminal system. Those peripheral devices shown in FIG. 3 which are not conventional are described in sufficient detail to permit implementation of the overall system in my copending patent applications referenced above.

FIG. 4 schematically illustrates the internal construction of keyboard 14. A series of timing input lines D1 through D12 (lines 20, FIG. 2) are arranged at right angles with respect to three output lines KB1, KB2 and KB3 (lines 18, FIG. 2). Any of the timing lines can be electrically connected to any of the output lines at their intersection by a switch contact actuated by a corresponding key on the keyboard. FIG. 4 illustrates these connections as mechanical switches, however, it will be understood that electronic switches may be used for reasons of speed and reliability.

The individual keys corresponding to each of the various intersection switches are shown immediately to the right of the corresponding contact. Thus, the digits 0 through 9 will be output on line KB1 at designated times. For example, depression of the keyboard key for the digit 9 will cause timing line D6 to be connected to output line KB1. Lines D1 through D12 are supplied with timing signals T1 through T12 shown diagramatically at the upper portion of FIG. 4. Thus, line D6 will receive a timing pulse at time T6 and with the 9 key depressed that pulse will be output on line KB1 at time T6. The control center, and processor modules will interpret a signal on line KB1 at time T6 as the digit 9 and will convert that digit into BCD form for internal processing and to seven segment form for display. In FIG. 4 the decimal and sign keys, the memory control keys, and the three clear keys will be output on line KB2. Similarly, the telephonic keys Dial, Send Data, Operator, * and # signals will be output on line KB3. Timing line D1 and output line KB3 are momentarily connected by a set of contacts which are responsive to activation of the EBT power-on switch and provide a reset signal for all system bistable devices.

FIG. 4 also shows the timing signals T1 through T12 being supplied over lines D1 through D12 to an idealized peripheral device 118. These timing signals are used within the peripheral device for appropriate decoding and function sequencing. In turn the peripheral returns peripheral control signals to the keyboard over line 120 for output to the control center module over line KB3.

FIGS. 5A and 5B together comprise a data flow diagram illustrating the functional sub-components within control center module 22 and their logical interconnection. The major functional units contained within the control center module include the following: BCD-keyboard logic section 140; timing section 150; rotary formatter section 160; Touch-tone encoder section 170; BCD encoder-formatter 180; four-bit digit register 190; and function control block 200 which is shown in expanded detail in FIG. 6.

BCD-keyboard logic section 140 provides the interface between control center module inputs from the keyboard and from peripheral devices on one hand and the processor module on the other. BCD data from peripheral bus 36 enters the control center module on lines 44 and is immediately decoded within logic block 140 by BCD to hex-decimal decoder 142. Since the processor module is designed to accept input data only in time-multiplexed form, the BCD data entering the control center module on lines 44 from the peripheral devices must be converted into that form before being supplied to the processor module. This function is accomplished within logic block 140 by the combination of BCD decoder 142 and a series of AND-gates 144 connected to corresponding outputs of decoder 142.

The BCD data from peripheral bus 36 (FIG. 2) is supplied on input lines 44 as four-bits of data on lines DI-01, DI-02, DI-03 and DI-04, together with a data strobe signal DAS. The function of the data strobe signal is to act as a load command for the decoder to precisely designate the instant at which the incoming BCD data is to be interpreted.

Each of the output lines of decoder 142 is connected to a corresponding one of AND-gates 144. The other input of each AND-gate is supplied with the appropriate one of timing signals T1 through T12 to properly re-encode the decoder output into time-multiplexed form. Thus, for example, an incoming BCD digit on lines 44 which is decoded by decoder 142 as a 9 will cause a signal to appear on decoder output line 9. This signal is in turn supplied to AND-gate 144a which has its other input supplied with timing signal T6. The signal on output line 9 of decoder 142 will thus be gated through And-gate 144a at time T6. This signal will pass through Or-gate 146a to processor module 26 where it will be immediately converted back to BCD form for processing therein. In the same manner, if a BCD input character on lines 44 is interpreted by decoder 142 as having the value "14", decoder output line 14 will supply a signal to And-gate 144n, This And-gate is also supplied with timing signal T12 and thus at time T12 and And-gate will pass a signal to the processor module through Or-gate 146b, where it will be decoded as a Recall Memory (RM) command.

As discussed in connection with the description of the internal keyboard construction shown in FIG. 4, keyboard output lines 18 are in reality three separate lines KB1, KB2 and KB3. These three lines contain all keyboard data in time-multiplexed form. The data on two of the three keyboard output lines, KB1 and KB2, is gated through the control center module to the display buffer section of the processor module via processor input lines 26. The keyboard output entering the control center module on line KB1-I is gated through Or-gate 146a to output line KB1-0, while keyboard output signals entering the control center module on line KB2-I are gated through Or-gate 146b to output line KB2-0. It will be seen that lines KB1-0 and KB2-0 are collectively designated in FIG. 2 as lines 26.

Timing section 150 has two primary functions. First, it generates the necessary rotary dial and Touch-tone timing signals which are respectively supplied to rotary formatter 160 and Touch-tone encoder 170 over lines 152 and 154. These timing signals are used within the rotary formatter and Touch-tone encoder to generate a rotary dial pulse putput on line 52 (FIG. 2) or a Touchtone output on line 50 which is compatible with the external telephone network environment.

The second function of timing section 150 is to provide a source of digit timing signals T1 through T12 within the control center module. In order to properly synchronize these timing signals with those generated within the processor module, a timing synchronization signal corresponding to T1 is supplied to timing section 150 from the processor module over line 32 (FIG. 2). The reconstituted digit timing signals T1 through T12 are generated in a 12 bit shift register 156 and are output over lines 158.

Finally, both the rotary/Touch-tone timing and digit timing subsections of timing section 150 are supplied with a basic clock frequency $F_o$ from the system clock 46. In the rotary and Touch-tone timing subsection of timing section 150, the basic clock frequency is supplied to a binary frequency dividing counter having outputs 152 and 154 at the appropriate stages. Thus, if $F_o$ is 25 KHZ, the arrangement shown in FIG. 5A will produce a basic rotary dial timing signal on line 152 at 100 HZ and a basic Touch-tone timing signal on line 154 at 10 HZ. The digit timing signals T1 – T12 generated in shift register 156 are supplied both to And-gates 144 in logic block 140 for re-encoding of BCD data from peripheral devices into time-multiplexed format and to function control block 200 for decoding and function sequencing within that unit.

Referring now to that portion of the control center module illustrated in FIG. 5B, the contents of the display buffer section of processor module 24 is simultaneously supplied to display panel 16 and to the control center module over lines 28a and 28b respectively in seven segment form. Since all internal operations within the control center module, and specifically within function control block 200 therein, require data in BCD form, the seven segment display data must be initially converted to BCD after entry into the control center module. Seven segment information on input lines DS1 – DS5 and DEC (which collectively comprise lines 28b) are converted in BCD encoder-formatter 180 to four bit BCD characters which are in turn supplied to digit register 190 which serves as a four bit input buffer for the function control block 200.

Each time the function control circuitry outputs a load signal on line 192 the contents of digit register 190 are replaced by the BCD analog of the character appearing on lines 28b from the display buffer section of the processor module. The particular digit in the display buffer is carried on output lines 28b at any instant will vary since the individual digits of the maximum possible twelve digits in the displayed number are sequentially and cyclically sampled by those lines. Consequently the appearance of the digit register load signal on lines 192 is timed by the circuitry within function control block 200 to successively load display digits into register 190 in decreasing order of significance, i.e. from left to right as appearing in display panel 16. Thus, when data in the processor module display buffer is processed within the control center module to produce either a Touch-tone or rotary dial output on lines 50 and 52 respectively, or a BCD digit output on lines 54, the information will be handled within the control center module one digit at a time in decreasing order of significance in the case of numerical data, or from left to right in the case of a telephone number.

The internal design and operation of function control block 200 will be discussed below in connection with FIG. 6. At this point, however, the relationship of the function control block to the remainder of the control center module will be discussed with emphasis on its inputs and outputs.

In addition to receiving timing signals T1 through T12 on line 158 and a four bit BCD character from digit register 190 on lines 194, function control block 200 also receives the following additional inputs. External mode commands 48 (FIG. 2) designate various aspects of the environment in which the EBT functions. While in the disclosed embodiment these external mode commands are preselected during assembly of the EBT and are field modifiable, it will be appreciated that the mode commands could be entered via keyboard 14 and thus be under operator control. For example, depending on the condition of the rotary/Touch-tone select signal on line 202 function control block 200 will output a signal on the appropriate one of either rotary enable output line 204 or Touch-tone enable output line 206. These signals are respectively supplied to rotary formatter 160 and Touch-tone encoder 170.

If the rotary enable signal is the active output from the function control block, rotary formatter 160 will convert the BCD digit appearing at function control output lines 208 into a properly shaped pulse train which is output on line 52. If, on the other hand, the rotary/Touch-tone select switch 202 is wired in Touch-tone position the active enable output from function control block 200 will be on Touch-tone enable line 206 which in turn causes Touch-tone encoder 170 to generate the appropriate 2 out of 8 frequency code representing the digit on lines 208 and to output the digit in proper Touch-tone format over lines 50.

Function control block 200 is also provided with another optional preselected mode command on line 210 designated in FIG. 5B as Access Digit. This is used, for example, when the EBT operates in telephone mode in a "Centrex" environment commonly found in PBX/PABX installations. In a Centrex system outgoing calls to numbers external to the private branch exchange must be preceded with a particular predesignated digit, most commonly the digit 9. When the EBT is operating in a Centrex environment the function control circuitry will examine an entered telephone number to determine whether the prefix portion is present. This will be interpreted as an outgoing call rather than an intra-branch exchange call and the digit 9 (or any other desired digit) will be automatically impressed onto the number ahead of the prefix (or area code if present) and a suitable delay interval inserted between the access digit and telephone number for dial-tone acquisition.

Additional mode commands Pause On 1 and Pause On 2 respectively appearing in FIG. 5B on function control input lines 212 and 214 are used to designate whether the access code is one or two digits. Pause On 1 in combination with an AD command inserts the dial tone acquisition delay after the first digit in the telephone number supplied to the rotary or Touch-tone formatter and Pause On 2 causes the delay to occur after the second digit encountered.

Turning now to the outputs of function control block 200, as previously mentioned the four bit BCD character is output from the function control block over lines 208. These output lines also include a data valid (DAV) signal which indicates to rotary formatter 160, Touch-tone encoder 170 or EBT peripheral devices over lines 54 and bus 36 that the data being received has been analyzed and suitably modified by the function control circuitry in accordance with the external mode commands entering on lines 48 and the keyboard function control commands input on line KB3.

Function control block 200 also outputs a timing pause signal $T_p$ on line 216 which is supplied to the inter-digit interval generator portion of rotary formatter 160. The pause signal is used in the rotary formatter to produce the necessary timing interval between the pulse groups representing each successive telephone number digit.

Signals representing Touch-tone keys * and # are supplied by the function control block over lines 218 to the 2 out of 8 frequency encoder 172 within Touch-tone encoder section 170. These two characters must be supplied to the Touch-tone encoder separately from the four-bit BCD character output from the function control block on lines 208 since these characters are not stored in the processor module display buffer or shown on the display panel. Thus, instead of being output from keyboard 14 on lines KB1 or KB2 and routed through the processor module 24 to BCD encoder 180 and digit register 190 these signals are supplied directly from the keyboard to function control block 200 on line KB3 along with certain other telephone control commands not relevant to the display function, such as DIAL, SEND DATA and OP (see FIG. 4). As will be seen below in connection with FIG. 6 the * and # characters supplied to function control block 200 on KB3 are decoded therein from time-multiplexed form and supplied to Touch-tone encoder section 170 over output lines 218.

FIG. 5B also shows an input to the function control block on line 220 designated PND (present next digit). This signal originates from the output of the inter-digit interval generator portion of rotary formatter 160 and is used to signify to the function control block that the next successive digit of the telephone number should be loaded into digit register 190 for analysis by the function control circuitry. The PND signal causes the timing section within the function control block to output a load signal on line 192 at a time when the next successive digit in the telephone number is appearing on lines 28b which are continuously sampling the individual digits of the number stored in the display buffer in a cyclical fashion.

It will be seen below that the function control circuitry within block 200 operates on a two-phase cycle as follows. During phase A, the data analysis phase, the BCD coded digits of the number stored in the display buffer section of the processor module are sequentially examined under control of the keyboard function commands on KB3 and the various externally supplied mode commands on lines 48. During the second or data modification phase, phase B, the display digits are again sequentially input to the function control block and during this phase designated modifier digits are inserted into the BCD digit stream issuing from digit register 190 at appropriate positions or certain digits present in the data stream are suppressed and the so-modified number is output digit-serially over lines 208 along with the data valid signal, which represents that the data has been examined and placed in the proper form.

Turning now to the rotary formatter section 160 and Touch-tone encoder section 170, the application of the appropriate enabling signals 204 and 206 from the function control block 200 have already been discussed. In addition to the enabling inputs the rotary formatter and Touch-tone encoder are provided with appropriate clock signals from timing section 150. These timing frequencies are used to produce automatic dialing signals which are compatible with the external common carrier network. For example, rotary formatter 160 receives a 100 HZ signal from the timing section on line 152 while Touch-tone encoder 170 is supplied with a 10 HZ timing frequency on line 154.

In the rotary formatter on coincidence of a rotary enable signal on line 204 and a data valid signal on lines 208a at the input of And-gate 161 the BCD digit on lines 208a will be gated through gated encoder 162 and loaded onto four-bit comparator 163. Comparator 163 is simultaneously supplied with the output from Mod 10 counter 164. The counter is incremented by clock pulses on line 165 until its count "B" which is supplied to comparator 163 matches the value "A" of the BCD digit from the function control block on lines 208a.

Each time the counter is incremented and its output B remains less than BCD digit value A the comparator outputs a signal to And-gate 166. And-gate 166 is also supplied with the rotary enable-data valid coincidence signal and thus each time A is less than the new incremented value of B And-gate 166 will supply an output signal to And-gate 167 and also, through an inverter, to And-gate 168. And-gate 167 also receives the output of 40/60 duty cycle unit 169, which is supplied with the 100 HZ clock signal entering the rotary formatter on line 152.

The output of the 40/60 duty cycle unit 169 will thus be a pulse train having a period of 100 miliseconds with a 40 milisecond pulse width and a 60 milisecond break. Application of this pulse train to And-gate 167 together with the And-gate 166 output results in output of the comparator pulse suitably shaped from the rotary formatter over line 52. The same pulse output from And-gate 167 is supplied to counter 164 over line 165 and increments the counter until a number of pulses equal to the numerical value of the BCD digit on lines 208 has been generated by the comparator and output on line 52, at which time A will equal B, the comparator will no longer supply a signal to And-gate 167, the output of 40/60 duty cycle generator 169 will no longer be gated to line 52 and the pulse train will terminate.

At this point the inter-digit interval logic is activated by coincidence of input signals at And-gate 168. The counter arrangement within the inter-digit interval section will generate a PND output signal only after 10 pulse break times, or an inter-digit interval of 600 miliseconds, has elapsed. After this inter-digit interval application of a PND signal to function control block 200 will cause the next display digit to be loaded into digit register 190 and the next successive digit of the modified telephone number will be supplied to the rotary formatter over lines 208a. Finally, timing pause signal $T_p$ is supplied to the inter-digit interval logic over line 216 and causes a dial tone acquisition delay to be generated between an access digit and the telephone number itself. As will be described, $T_p$ is generated by the function control timing circuitry in response to the presence of AD command in combination with either Pause On 1 or Pause On 2 commands.

Touch-tone encoder 170 receives the BCD digit from function control block 200 over lines 208b. In addition coincidence of a data valid signal on lines 208b and a Touch-tone enable signal on line 206 causes And-gate 171 to provide a signal to one input of And-gate 173. The other input of And-gate 173 is connected to the output of 60/40 duty cycle unit 174 which is supplied with the 10 HZ clock signal from timing section 150 on line 154. Coincidence of these inputs at And-gate 173 will enable 2 out of 8 frequency encoder 172 to convert the BCD digit appearing on lines 208b into Touch-tone format having the proper characteristics.

Referring now to FIG. 6 the internal logic design and operation of function control block 200 will now be discussed.

As previously mentioned the circuitry within function control block 200 operates on the BCD digit contained in digit register 190 in accordance with a two-phase cycle including data analysis (phase A) and data modification (phase B). During the analysis phase the BCD digits successively loaded into digit register 190 in response to a load signal on line 192 from the timing circuits within function control block 200 are tested in accordance with certain function control commands from the keyboard and external preselected mode commands.

For example, keyboard output line KB3 supplies certain telephone function control commands in time-multiplexed form such as DIAL, OP, SEND DATA, etc. (see FIG. 4) directly to function control block 200. These KB3 signals are decoded from time-multiplexed form by function decoding logic 230 which is also supplied with timing signals T1 through T12 from the function control timing section 150 on lines 158.

In addition, as was seen in connection with FIG. 4, KB3 also carries various peripheral control signals supplied to the keyboard from peripheral devices through bus 36 and line 120. Function decoding logic 230 decodes the KB3 signals and supplies them to the various data evaluation and modification circuitry shown in the lower half of function control block 200 in FIG. 6. In addition, function decoding block 230 provides the decoded signals representing the * and # characters to Touch-tone encoder section 170, over lines 218, as previously discussed in connection with FIG. 5B.

During phase A the BCD digits loaded into digit register 190 are examined by the function control circuitry to be described below in sequence and certain digit insertion or blanking flags are set in response to the examination. During the data modification phase the number is again loaded into register 190 in digit serial fashion and the digit insertion and blanking flags set in the preceding phase cause the displayed number to be output with certain digits inserted in the digit stream or certain digits of the number suppressed.

Timing circuitry within the function control block supplies a load signal on line 192 to digit register 190 at proper times so that successive digits of the number in the display buffer are sequentially examined during phase A and gated through the function control block during phase B in appropriately modified form, even though the display digit sampled by lines 28b is rapidly changing cyclic fashion. The digit insertion and blanking flags within function control block 200 operate on the BCD digit stream entering the function control block on lines 194 to produce a modified digit stream leaving the function control block on lines 208 in the following manner.

AD flag 240 receives the following inputs. External mode command Ad on line 210 designates that the EBT is operating within a Centrex-type network and that all outside telephone calls are to be automatically preceded with a certain preselected digit typically the digit 9. A keyboard function control command appearing on line KB3 at time T2 is interpreted by function decoding logic 230 as a Dial signal which is in turn supplied to AD flag 240. Presence of the Dial signal indicates that the digit stream appearing on lines 194 is a telephone number.

Finally, timing signals T5 through T7 are supplied to AD flag 240 and cause the flag circuitry to interrogate the digit stream on lines 194 at times T5 – T7. If digits are encountered during this interval (and the Ad and Dial inputs are also present) the AD flag will interpret the digits as a telephone prefix and the flag will be set indicating that during phase B the digit 9 (or any other preselected one or two digit access code) should be inserted in the digit stream output from the function control block on lines 208 ahead of the prefix (or the area code if present). The AD flag DAV (data valid) output will remain inactive during phase A and thus insure that the digit appearing on lines 194 will not be gated to the function control output by data gate 250 during the examination phase.

Digit blanking flag 242 is used to cause a sign or decimal character appearing on lines 194 to be suppressed or not depending on whether peripheral devices which are to receive the data are equipped to handle decimal and sign characters. For example, a keyboard function control command appearing on line KB3 at time T8 will be interpreted by function decoding logic 230 as a SAD (signal and decimal enable) signal indicating that the receiving peripheral should receive the sign or decimal character unaltered. This SAD signal was supplied to the keyboard from the receiving peripheral 118 over line 120 (see (FIG. 4). The SAD output of function decoding logic 230 is applied to sign and decimal blanking flag 242 and its presence indicates the character on lines 194 should not be suppressed.

Similarly, s aignal on KB3 at time T3 will be decoded by logic 230 as a Send Data signal either from the keyboard or from a requesting peripheral device. Application of the Send Data command signal to sign and decimal blanking flag 242 will indicate that the character appearing on lines 194 is a decimal character and not a telephone number digit. The sign and decimal blanking flag is so arranged that if the Send Data input is present but the SAD input is not, the flag will be set and during the data modification phase the sign and decimal characters will be suppressed in the digit stream output on lines 208. This is accomplished by inhibiting the DAV output which would normally be active during phase B at the corresponding location in the digit stream.

Finally, NZ (non zero) flag 246 is used to insert zeros into the digit stream on lines 194 at those digit locations where no data is present. This is used when the receiving peripherals require fixed word input having a predesignated number of digits. NZ flag 246 is enabled by the presence of $\overline{\text{LZS}}$ (unsuppress leading zeros) which enters the function control block on line KB3 at time T7 and is decoded by function decoding logic 230. $\overline{\text{LZS}}$ signal originates from the receiving peripheral 118 (FIG. 4) which supplies it to the keyboard over lines 120. When this input is present NZ flag 270 will be set and during phase B a sequence of zeros will be inserted into the digit stream ahead of the first digit to fill out the fixed word format.

The digit timing circuitry within function control block 200 is shown in FIG. 6 just below the digit insertion and blanking flags 240, 242 and 246. This timing section controls generation of the digit load signal supplied on line 192 to digit register 190 in response to the following status inputs describing the EBT operating mode: rotary/Touchtone select input on line 202 indicating telephone operation; and RFD and SEND DATA inputs on KB3 decoded by function decoding logic 230 indicating data terminal operation. The timing section also receives the PND (present next digit) signal on line 220 from the output of the inter-digit interval portion of rotary formatter 160 (FIG. 5B). Finally, the timing section receives preselected mode commands Pause On 1 and Pause On 2 on lines 212 and 214 respectively. These latter commands cause the function control timing circuitry to output a $T_p$ (pause) signal after either a 1 or 2 digit access code when AD flag 240 is set. This $T_p$ signal is supplied to the inter-digit interval generating portion of rotary formatter 160 and used therein to halt the dialing pulse output after the access code in order to insure outside line dial tone acquisition.

The digit timing circuitry within function control block 200 is arranged to operate either synchronously or asynchronously depending on the condition of the various status inputs. For example, asynchronous scan flag 250 receives the PND, RFD and rotary select inputs indicating asynchronous operation while synchronous scan flag 252 receives the SEND DATA and Touch-tone select inputs indicating synchronous operation.

Thus, if the EBT is operating in either rotary telephone mode (rotary select input present) or in data transmission mode and a requesting peripheral device requires asynchronous input (RFD present) then upon receipt of a PND signal either from the rotary formatter on line 220 or from the requesting peripheral on line KB3, asynchronous scan flag 250 will be set and the digit loading sequence in register 190 will occur in an asynchronous manner upon receipt of a PND signal by the timing circuitry which in turn produces a digit load signal on line 192. Similarly, if the EBT is operating in Touch-tone telephone mode (Touch-tone selection input present) or is transmitting data to a peripheral device which can receive synchronous data input (Send Data input present) then synchronous scan flag 252 will be set and the digit load signals on line 192 will occur synchronously.

Superimposed on this general synchronous/asynchronous scheme is the provision for a fixed interval delay after predesignated digits in a telephone number response to the presence of an AD command in combination with either Pause On 1 or Pause On 2 commands which indicate a centrex or tieline environment wherein after a 1 or 2 digit access code a dial tone must be acquired before the outgoing number is dialed.

Timing circuitry 254 provides the described synchronous/asynchronous generation of digit load signals as follows. The inter-digit delay portion of timing circuit 254 outputs an incrementing pulse to scan digit position counter 256 after a predesignated time interval has elapsed from receipt of the asynchronous scan flag signal. In a similar manner the 10 HZ Touch-tone rate clock portion of timing circuits 254 will provide a synchronous counter incrementing signal to scan digit position counter 256 in response to the output of synchronous scan flag 252. Finally, the access dial tone wait portion of timing circuit 254 generates 1 of 2 outputs depending on whether the EBT is operating in rotary telephone or Touch-tone telephone mode. Specifically, in rotary mode the access dial tone circuitry will generate a $T_p$ signal after the access digit. This signal is supplied to the inter-digit interval portion of rotary formatter 160 and causes an appropriate delay in the pulse output therefrom as described above. In telephone mode the dial tone acquisition circuitry will appropriately delay the incrementing signal for scan digit position counter 256.

Scan digit position counter 256 is a two-phase counter which steps through the twelve digit times once during phase A and once during phase B in response to incrementing signals from either the inter-digit delay, Touch-tone rate clock or dial tone acquisition delay portions of timing circuits 254. The counter output representing the digit time of the current contents of digit register 190 is combined with timing signals T1 through T12 in timing select circuit 258. This results in a digit load output on line 192 at a time when the next successive digit to be interrogated or processed is determined to be on digit buffer input lines 182 (FIG. 5B). This synchronization is necessary since as described above the particular display digit appearing on lines 28b and thus lines 182 is continuously cycling through the 12 possible display digit positions.

During phase B counter 256 provides an output designated in FIG. 6 as $\phi$ B. This counter output is supplied to one input of And-gate 260, the other input of which receives the digit load signal from timing select circuit 258 on line 192. Thus, And-gate 260 will be enabled at each digit load time during the data modification phase. The output from And-gate 260 is supplied to one input of And-gate 262 the other input of which receives the data valid signal (DAV) from the digit insertion and blanking flags 240, 242, and 246. These flags are arranged so that the data valid output is inactive during phase A. Moreover, as previously discussed, the DAV output from sign and decimal blanking flag 242 is also inactive during phase B whenever a suppressed decimal or sign is encountered in the digit stream on lines 194.

Thus, it is seen that And-gate 262 will be enabled if at all only during phase B. The output of And-gate 262 represents the gating of the data valid signal to the output of function control block 200 during the data modification phase in synchronism with generation of the digit register load signal on line 192. In addition, the output of And-gate 262 is supplied to the select input of data gate 250 which also receives two four-bit BCD digit inputs. The first digit input on lines 194 represents the contents of digit register 190 while the second input carries the output from code generating matrix 248. Code generating matrix 248 is in turn supplied with the Force 9 output of AD flag 240 and the Force 0 output of NZ flag 246. The significance of these outputs has already been discussed. Code generating matrix 248 also receives an input in the form of the Operator (OP) function control command decoded from keyboard line KB3. The Operator summons command is interpreted by code generating matrix 248 as being identical to the Force 0 output of NZ flag 246.

Code generating matrix 248 provides an output to data gate 250 in the form of either a 0 or 9 digit in four bit BCD format for insertion into the digit stream on lines 194 depending on whether it represents an access digit, an Operator summons or is required to fill-out a number for fixed word transmission.

Thus, the overall effect of the phase B function control operation is that the digit stream appearing on lines 194 will be gated through data gate 250 to output lines 208 with certain modifications in the form of 0 and 9 digit insertion or digit suppression of sign and decimal characters.

FIG. 7 depicts in schematic fashion the principle of operation of articulated display module 40 and its interconnection with display panel 16.

Timing signals T1 through T12 are supplied to articulated display module 40 on input timing lines 38 also shown in FIG. 2. A typical telephone number including area code, prefix and suffix is shown at the top of FIG. 7 in non-articulated format — i.e. compressed to the right as stored in the display buffer section of processor module 22. The individual digits of the telephone number are illustrated in association with the corresponding timing signal input lines 38.

When mode switch 42 is actuated in its position corresponding to articulated display presentation certain of the input timing signals on lines 38 corresponding to the individual digits of the compressed telephone number are shifted within module 40 to different timing output lines 43 as follows. The suffix portion of the telephone number — in this case 4757 — passes through display module 40 unaltered and exits on the same timing lines T9 through T12. The timing signals T6 – T8 corresponding to the prefix digits 397 on the other hand are each shifted one timing line to the right and exit from the display module 40 on timing lines T5 –T7. This results in a one digit spacing between the prefix and suffix of the telephone number as displayed. Similarly, the timing signals corresponding to the area code 415 on lines T3 – T5 are shifted two timing lines to the left and exit from display module 40 on timing lines T1 – T3 inserting one digit space between the area code and prefix.

The segmented digit timing signals derived as above are supplied to the digit select inputs of display panel 16 and control the placement of the individual display digits within the panel. The seven-segment signals representing the display digits (including the decimal character) are supplied in timed digit sequence to display panel 16 over lines 28 from the display buffer section of the processor module and are routed to the appropriate seven-segment display location (e.g. Nixie tube) by the digit select line which is then active. It will be appreciated that when mode switch 42 is in its non-articulation position the digit select timing signals on input lines 38 leave display module 40 on the same lines and cause the digits supplied to panel 16 to be displayed as stored in the display buffer.

It will be seen that implementation of the display articulation approach represented by FIG. 7 results in fixed articulated display of an entered telephone number. The term fixed indicates that as the telephone number is entered one digit at a time via keyboard 14 and serially loaded into the display buffer within processor module 30 it is simultaneously displayed on display panel 16 such that the individual digits move from right to left thereon until the entire number is displayed. However, as the entered telephone number moves from right to left across the display panel the displayed segmenting blanks between suffix and prefix and between prefix and area code will remain fixed with respect to the display positions. This results in a situation wherein the entered telephone number is not easily verified visually until the entire number has been entered. A more desirable approach is to have the blanks move along with the entered number in their final position relative thereto as the number moves from right to left on the display. Such a fully automatic articulation approach must take into account the following situations if improper grouping during entry (and after complete entry) is to be avoided:

1. Operater Assisted Calls (OAC)

OAC involves entering one or more leading digits (such as 0) before dialing the telephone number to be called. This may be accomplished as described in detail below in connection with FIG. 8 by examining the first two digit entries following a dial command and comparing them against stored constants representing local operator assist codes (typically 0, 1, 01 and 10). If an operator code is found, articulation will be delayed until the end of the operator code.

2. Exchange Environment

In a PABX environment one or more access digits must be dialed to access outside lines prior to dialing the called subscriber's number. In a multi-level network environment several sets of access digits may precede the basic number. In a centrex environment a complete address may comprise a total of only four digits. In the present invention means are provided for counting the number of digits before a dial-out command is given. If the number of digits is three or less the articulation process will be delayed until the next series of digits are entered.

After operator code and exchange access digits are verified, means are provided at the start of an articulation process to detect the entry of the fifth digit, whereupon, the first three digits are shifted left by two digit positions to obtain a 3-2 grouping. Upon detection of the eighth digit the first six digits are shifted left by two positions to obtain a 3-3-2 grouping. At all other times each digit is shifted left without rearranging the original contents of the display register other than a single position left shift.

3. Conservation of display upon overflow

In the event of display overflow of an articulated number it is desirable to provide means for disabling articulation (i.e., shifting to non-articulated display mode) so that final overflow will occur only when all display positions are loaded with numeric information. This is achieved in the present invention by inclusion of means for examining the most significant digit (MSD) for overflow while in articulation. Upon overflow detection means are provided to shift all digits right until all blanks are "squeezed out".

4. Editing

In the event of an entry error, editing — i.e., backspace correction — without deviating from basic articulation format is a desirable feature. In other words, the articulation process should be completely reversible. This is accomplished by the provision of means for clearing the display shift register each time the backspace key is actuated. Following a backspace command, operator code and exchange access digits are verified and the articulation process is repeated. By counting the contents of the display shift register each non-vacant position is treated as a digit entry command to the articulation means.

5. Interim deviation from format during entry

In an ideal articulation scheme the components of a phone number are strictly articulated as the digits are keyed in. In less than ideal schemes, the correct articulation is available only after the entire number is entered. This is what has been described as "floating" versus fixed articulation. Examples of the fixed articulation approach are: fixed articulation locations as in FIG. 7, and no articulation until some final command such as dial is initiated. In either case, ease of verification and correction during entry is sacrificed.

Assuming floating articulation is desired, some deviation from perfect articulation is unavoidable. For example, a common grouping of 3-4 (prefix plus suffix) is not a subset of an equally common grouping of 3-3-4 (area code plus prefix plus suffix).

An intelligent articulation scheme is necessary to eliminate both user forethought and custom field installation and still provide optimum format conformance for any combination of the situations listed above. Unavoidable interim deviation is limited to a single digit which is under-articulated but forgiven on the next entry. For example, the first four digits of a common seven digit number are entered under-articulated as contiguous digits (4), rather than a correct (3-1) grouping. Articulation starts on the fifth digit to obtain a postponed but correct interim grouping of (3-2). However, in the case of a four digit centrex address, an unforgiven over-articulated (3-1) grouping display is avoided by the above compromise.

One specific implementation of these design objectives will now be discussed in connection with FIG. 8. The numeric information entered via keyboard 14 is stored in the output section of the display buffer of processor module 24 (see FIG. 2). The information is then supplied (in seven segment form) over line 28a to the display articulation logic 40. The digit-serial signals on line 28a enter display shift register 310 via a shift control unit 312 and are constantly recirculated through the shift register and shift control. Shift control 312 performs the various shifting functions — i.e., shift right, shift left, or insert blank. Each time a new digit is entered the display is shifted one position to the left and the new digit is entered into the least significant digit (LSD) position.

The first two digits after a blank display are interrogated by Leading 0/1 latch 314. If the leading digit is not a 0 or a 1, articulation counter 316 is enabled and starts counting every digit. When the first five digits are counted the fifth digit is decoded and blank insert unit 318 instructs shift control 312 to insert a blank between the third and fourth digits. When the eighth digit is entered and decoded, blank insert unit 318 again transmits a blank shift command to shift control 312 and this time the blank is inserted between the sixth and seventh digits. When the thirteenth digit is inserted a signal from the display indicates that the MSD position is filled and all the blanks are then removed compressing the number.

When the first digit is a 0 or a 1, articulate counter 316 is disabled. If the first two digits are either 01 or 10, the articulate counter remains disabled. Upon receipt of the next digit, the articulate counter is enabled to resume its normal operation. The following tables illustrate several examples of floating articulation in operation.

TABLE 1

| Normal Number | | | | | | | | | | | Comments |
|---|---|---|---|---|---|---|---|---|---|---|---|
| | | | | | | | | | | 4 | |
| | | | | | | | | | 4 | 1 | |
| | | | | | | | | 4 | 1 | 5 | |
| | | | | | | | 4 | 1 | 5 | 5 | |
| | | | | | | 4 | 1 | 5 | 5 | 4 | Blank & shift left |
| | | | | | 4 | 1 | 5 | 5 | 4 | 3 | |
| | | | | 4 | 1 | 5 | 5 | 4 | 3 | 1 | |
| | | | 4 | 1 | 5 | 5 | 4 | 3 | 1 | 2 | Blank & Shift left |
| | | 4 | 1 | 5 | 5 | 4 | 3 | 1 | 2 | 1 | |
| | 4 | 1 | 5 | 5 | 4 | 3 | 1 | 2 | 1 | 2 | |
| 4 | 1 | 5 | 5 | 4 | 3 | 1 | 2 | 1 | 2 | 3 | |
| 4 | 1 | 5 | 5 | 4 | 3 | 1 | 2 | 1 | 2 | 3 | 4 | |
| 4 | 1 | 5 | 5 | 4 | 3 | 1 | 2 | 1 | 2 | 3 | 4 | 5 | Remove blanks & compress |

TABLE 2

| Leading "0" (Operator intercept in PTT area) | | | | | | | | | | | COMMENTS |
|---|---|---|---|---|---|---|---|---|---|---|---|
| | | | | | | | | | | 0 | |
| | | | | | | | | | 0 | 4 | |
| | | | | | | | | 0 | 4 | 1 | |
| | | | | | | | 0 | 4 | 1 | 5 | |
| | | | | | | 0 | 4 | 1 | 5 | 5 | |
| | | | | | 0 | 4 | 1 | 5 | 5 | 4 | |
| | | | | 0 | 4 | 1 | 5 | 5 | 4 | 3 | |
| | | | 0 | 4 | 1 | 5 | 5 | 4 | 3 | 1 | |
| | | 0 | 4 | 1 | 5 | 5 | 4 | 3 | 1 | 2 | |
| | 0 | 4 | 1 | 5 | 5 | 4 | 3 | 1 | 2 | 1 | |
| 0 | 4 | 1 | 5 | 5 | 4 | 3 | 1 | 2 | 1 | 2 | |
| 0 | 4 | 1 | 5 | 5 | 4 | 3 | 1 | 2 | 1 | 2 | 3 | |
| 0 | 4 | 1 | 5 | 5 | 4 | 3 | 1 | 2 | 1 | 2 | 3 | 4 | |

TABLE 3

| Leading "01" (Operator intercept in some GTE area) | | | | | | | | | | | |
|---|---|---|---|---|---|---|---|---|---|---|---|
| | | | | | | | | | | | 0 |
| | | | | | | | | | | 0 | 1 |
| | | | | | | | | | 0 | 1 | 4 |
| | | | | | | | | 0 | 1 | 4 | 1 |
| | | | | | | | 0 | 1 | 4 | 1 | 5 |
| | | | | | | 0 | 1 | 4 | 1 | 5 | 5 |
| | | | | | 0 | 1 | 4 | 1 | 5 | 5 | 4 |
| | | | | 0 | 1 | 4 | 1 | 5 | 5 | 4 | 3 |
| | | | 0 | 1 | 4 | 1 | 5 | 5 | 4 | 3 | 1 |
| | | 0 | 1 | 4 | 1 | 5 | 5 | 4 | 3 | 1 | 2 |
| | 0 | 1 | 4 | 1 | 5 | 5 | 4 | 3 | 1 | 2 | 1 |
| 0 | 1 | 4 | 1 | 5 | 5 | 4 | 3 | 1 | 2 | 1 | 2 |
| 0 | 1 | 4 | 1 | 5 | 5 | 4 | 3 | 1 | 2 | 1 | 2 | 3 |

TABLE 4

| Dialing Within a Centrex PABX | | | | COMMENTS |
|---|---|---|---|---|
|   |   |   | 4 |   |
|   |   | 4 | 3 |   |
|   | 4 | 3 | 2 |   |
| 4 | 3 | 2 | 1 |   |

TABLE 5

| Dialing Outside a PABX plus OAC | | | | | | | | | COMMENTS |
|---|---|---|---|---|---|---|---|---|---|
|   |   |   |   |   |   |   |   | 9 |   |
|   |   |   |   |   |   |   | 9 | 0 | Dial stop |
|   |   |   |   |   |   | 9 | 0 | 5 | Dial Operator |
|   |   |   |   |   | 9 | 0 | 5 | 4 |   |
|   |   |   |   | 9 | 0 | 5 | 4 | 3 |   |
|   |   |   | 9 | 0 | 5 | 4 | 3 | 1 |   |
|   |   | 9 | 0 | 5 | 4 | 3 | 1 | 2 |   |
|   | 9 | 0 | 5 | 4 | 3 | 1 | 2 | 1 |   |
| 9 | 0 | 5 | 4 | 3 | 1 | 2 | 1 | 2 |   |

TABLE 6

Leading "1"

|   |   |   |   |   |   |   |   |   |   |   |   | 1 |
|---|---|---|---|---|---|---|---|---|---|---|---|---|
|   |   |   |   |   |   |   |   |   |   |   | 1 | 4 |
|   |   |   |   |   |   |   |   |   |   | 1 | 4 | 1 |
|   |   |   |   |   |   |   |   |   | 1 | 4 | 1 | 5 |
|   |   |   |   |   |   |   |   | 1 | 4 | 1 | 5 | 5 |
|   |   |   |   |   |   |   | 1 | 4 | 1 | 5 |   | 5 | 4 |
|   |   |   |   |   |   | 1 | 4 | 1 | 5 |   | 5 | 4 | 3 |
|   |   |   |   |   | 1 | 4 | 1 | 5 |   | 5 | 4 | 3 | 1 |
|   |   |   |   | 1 | 4 | 1 | 5 |   | 5 | 4 | 3 |   | 1 | 2 |
|   |   |   | 1 | 4 | 1 | 5 |   | 5 | 4 | 3 |   | 1 | 2 | 1 |
|   |   | 1 | 4 | 1 | 5 |   | 5 | 4 | 3 |   | 1 | 2 | 1 | 2 |
| 1 | 4 | 1 | 5 |   | 5 | 4 | 3 |   | 1 | 2 | 1 | 2 | 3 |
| 1 | 4 | 1 | 5 |   | 5 | 4 | 3 | 1 | 2 | 1 | 2 | 3 | 4 |

TABLE 7

Leading "10"

|   |   |   |   |   |   |   |   |   |   |   |   | 1 |
|---|---|---|---|---|---|---|---|---|---|---|---|---|
|   |   |   |   |   |   |   |   |   |   |   | 1 | 0 |
|   |   |   |   |   |   |   |   |   |   | 1 | 0 | 4 |
|   |   |   |   |   |   |   |   |   | 1 | 0 | 4 | 1 |
|   |   |   |   |   |   |   |   | 1 | 0 | 4 | 1 | 5 |
|   |   |   |   |   |   |   | 1 | 0 | 4 | 1 | 5 | 5 |
|   |   |   |   |   |   | 1 | 0 | 4 | 1 | 5 |   | 5 | 4 |
|   |   |   |   |   | 1 | 0 | 4 | 1 | 5 |   | 5 | 4 | 3 |
|   |   |   |   | 1 | 0 | 4 | 1 | 5 |   | 5 | 4 | 3 | 1 |
|   |   |   | 1 | 0 | 4 | 1 | 5 |   | 5 | 4 | 3 |   | 1 | 2 |
|   |   | 1 | 0 | 4 | 1 | 5 |   | 5 | 4 | 3 |   | 1 | 2 | 1 |
| 1 | 0 | 4 | 1 | 5 |   | 5 | 4 | 3 |   | 1 | 2 | 1 | 2 |
| 1 | 0 | 4 | 1 | 5 |   | 5 | 4 | 3 | 1 | 2 | 1 | 2 | 3 |

While the specific embodiment of the electronic business telephone described in the preceding pages and illustrated in the drawings, is disclosed in sufficient detail to enable persons of ordinary skill in the art to practice the invention with a minimum degree of routine design experimentation it will nevertheless be appreciated that various modifications thereof can be made without departing from the scope of the invention as defined by the following claims.

What is claimed is:

1. An electronic communications terminal comprising:
    a. keyboard means for entry of numeric information and function control commands;
    b. displaya register means responsive to said keyboard means for buffer storage of so entered numeric information;
    c. display means responsive to said display register means for visual presentation of so stored numeric information;
    d. automatic dialing means associated with said display register means for generation of telephonic call placement signals representing said stored numeric information under control of at least one said function control commands indicating that said communications terminal is operating in telephone mode;
    e. arithmetic computation means associated with said display register means for performing calculations involving said stored numeric information and for supplying the results of said calculations to said display register means for visual presentation under control of at least one of said function control commands indicating that said communications terminal is operating in computation mode; and
    f. articulation means associated with said display register means and said display means for causing said stored numeric information to be displayed in a plurality of spaced segments only when the terminal is operating in the telephone mode.

2. The electronic communications terminal of claim 1 further comprising data transmission means associated with said display register means for generating digitally coded signals representing said stored numeric information and transmitting said signals to a remote location for processing under control of at least one of said function control commands indicating that said communications terminal is operating in data transmission mode.

3. The electronic communications terminal of claim 1 further comprising memory means communicating with said display register means for receipt of the contents thereof under control of at least one of said function control commands for indeterminate storage of said contents independent of said display means and for return of said contents to said display register means under control of another of said function control commannds for presentation to said display means.

4. An electronic communication terminal comprising:
    a. keyboard means for entry of numeric information and function control commands;
    b. memory means responsive to said keyboard means for storing so entered numeric information;
    c. display means responsive to said memory means for visually displaying so stored numeric information;
    d. automatic dialing means associated with said memory means for generating telephonic call placement signals representing said stored numeric information, said automatic dialing means being responsive to at least one of said function control commands indicating that said communication terminal is operating in telephone mode;
    e. data transmission means associated with said memory means for generating digitally coded signals representing said stored numeric information and transmitting said signals to a remote location for processing, said data transmission means being responsive to at least one of said function control commands indicating that said communication terminal is operating in data transmission mode;

f. arithmetic computation means associated with said memory means for performing calculations using said stored numeric information and for supplying the results of said calculations to said display means for visual presentation, said arithmetic computation means being responsive to at least one of said function control commands indicating that said communication terminal is operating in computation mode;

g. articulation means associated with said memeory means and said display means for causing said stored numeric information to be displayed in a plurality of segments, said articulation means being operated only when said communication terminal is operating in the telephone mode; and h. control means associated with said keyboard display means, memory means, data transmission means and arithmetic computation means responsive to said commands for controlling and coordinating said operating modes.

5. The electronic communications terminal of claim 4 wherein said arithmetic computation means further includes means for accumulating calculation results in said memory means under control of at least one of said function control commands.

6. The electronic communications terminal of claim 4 in combination with remotely located computer means and means interconnecting said remote computer and said communications terminal.

7. The communications terminal of claim 4 in combination with credit card reader means and means interconnecting said credit card reader means and said communications terminal.

8. The electronic communications terminal of claim 4 wherein said articulation means further comprises logic means for analyzing said stored numeric information and for selectively displaying at least a portion thereof in spaced segments on said display panel.

9. The electronic communications terminal of claim 8 wherein said logic means further includes means for insertion of blanks between said segments as the individual digits thereof are entered from said keyboard and simultaneously presented on said display panel.

10. The electronics communications terminal of claim 8 wherein said logic means further includes means for suppressing from presentation on said display panel predetermined operator access and exchange access digits leading said entered numeric information.

11. The electronics communications terminal of claim 8 wherein said logic means further includes editing means for backspace correction of numeric information presented on said display panel.

12. An electronic communications terminal comprising:

a. keyboard means for entry of numeric information and function control commands;

b. memory means responsive to said keyboard means for storing so entered numeric information;

c. display means responsive to said memory means for visually displaying so stored numeric information;

d. automatic dialing means associated with said memory means for generating telephonic call placement signals representing said stored numeric information, said automatic dialing means being responsive to at least one of said function control commands indicating that said communication terminal is operating in telephone mode;

e. data transmission means associated with said memory means for generating digitally coded signals representing said stored numeric information and transmitting said signals to a remote location for processing, said data transmission means being responsive to at least one of said function control commands indicating that said communication terminal is operating in data transmission mode;

f. arithmetic computation means associated with said memory means for performing calculations using said stored numeric information and for supplying the results of said calculations to said display means for visual presentation, said arithmetic computation means being responsive to at least one of said function control commands indicating that said communication terminal is operating in computation mode; and g. control means associated with said keyboard display means, memory means, data transmission means and arithmetic computation means responsive to said function control commands for controlling and coordinating said operating modes, said control means further comprising means for automatically generating signals representing an access digit code for combination with said telephonic call placement signals under at least partial control of said function control commands.

13. Apparatus according to claim 12 further comprising means for insuring presence of a dial tone after processing of said access digit code before further processing of said telephonic call placement signals occurs.

14. An electronic communication terminal comprising:

a. keyboard means for entry of numeric information and function control commands;

b. memory means responsive to said keyboard means for storing so entered numeric information;

c. display means responsive to said memory means for visually displaying so stored numeric information;

d. automatic dialing means associated with said memory means for generating telephonic call placement signals representing said stored numeric information, said automatic dialing means being responsive to at least one of said function control commands indicating that said communication terminal is operating in telephone mode;

e. data transmission means associated with said memory means for generating digitally coded signals representing said stored numeric information and transmitting said signals to a remote location for processing, said data transmission means being responsive to at least one of said function control commands indicating that said communication terminal is operating in data transmission mode;

f. arithmetic computation means associated with said memory means for performing calculations using said stored numeric information and for supplying the results of said calculations to said display means for visual presentation, said arithmetic computation means being responsive to at least one of said function control commands indicating that said communication terminal is operating in computation mode;

g. control means associated with said keyboard, display means, memory means, data transmission means and arithmetic computation means responsive to said commands for controlling and coordinating said operating modes; said control means further comprising encoder circuit means responsive to digit-representing signals characteristic of said keyboard-entered numeric information for converting said signals into binary-coded decimal form for analysis and modification; and h. data-handling circuit means responsive to said encoder means for converting said binary coded decimal signals received therefrom into modified digit signals including automatic dialing signals under at least partial control of said keyboard-entered function control commands; and said data handling circuit means further comprising:

rotary formatter circuit means for transforming binary-coded decimal signals into rotary-dial pulse train signals compatible with external common carrier telephone lines;

touch-tone encoder circuit means for transforming binary-coded decimal signals into frequency encoded signals compatible with external common carrier telephone lines;

function control circuit means responsive to said encoder means for receiving said binary-coded decimal digitrepresenting signals therefrom and directing said signals to one of said rotary formatter circuit means and said Touch-tone encoder means under at least partial control of said keyboard-entered function control commands; and said function control means further comprising digit insertion circuit means for generating binary-coded decimal modifier digit signals and combining said modifier digit signals with said digit representing signals received from said encoder circuit means to form a modified digit sequence based on said keyboard-entered numerical information under at least partial control of said keyboard-entered function control commands and supplying said modified digit sequence to one of said rotary formatter circuit means and said Touch-tone encoder circuit means.

15. The electronic communications terminal of claim 14 wherein said function control means further comprises digit blanking circuit means for suppressing selected ones of said digit representing signals received from said encoder circuit means to form a modified digit sequence based on said keyboard-entered numerical information under at least partial control of said keyobard-entered function control commands.

16. An electronic communications terminal comprising:

a. keyboard means for entry of numeric information and function control commands;

b. display means responsive to said keyboard means for buffer storage of so entered numeric information;

c. display means responsive to said display register means for visual presentation of so stored numeric information;

d. automatic dialing means associated with said display register means for generation of telephonic call placement signals representing said stored numeric information under control of at least one of said function control commands indicating that said communications terminal is operating in telephone mode;

e. articulation means associated with said display register means and said display means for causing said stored numeric information to be displayed in a plurality of spaced segments; and f. control means associated with said keyboard, display register and automatic dialing means responsive to said function control commands for controlling and coordinating said operating modes, said control means further including means for automatically generating signals representing an access digit code for combination with said telephonic call placement signals under at least partial control of said function control commands.

17. An electronic communications terminal comprising:

a. keyboard means for entry of numeric information and function control commands;

b. display register means responsive to said keyboard means for buffer storage of so entered numeric information;

c. display means responsive to said display register means for visual presentation of so stored numeric information;

d. automatic dialing means associated with said display register means for generation of telephonic call placement signals representing said stored numeric information under control of at least one of said function control commands indicating that said communications terminal is operating in telephone mode;

e. articulation means associated with said display register means and said display means for causing said stored numeric information to be displayed in a plurality of spaced segments only when the terminal is operating in its telephone mode; and f. control means associated with said keyboard, display register means, automatic dialing means responsive to said function control commands for controlling and coordinating said operating modes, said control means further including means for automatically generating signals representing an access digit code for combination with said telephonic call placement signals under at least partial control of said function control commands.

* * * * *